（12） United States Patent
Mercer et al.

(10) Patent No.: US 8,438,550 B2
(45) Date of Patent: *May 7, 2013

(54) TYPE PROPAGATION FOR AUTOMATIC CASTING OF OUTPUT TYPES IN A DATA FLOW PROGRAM

(75) Inventors: Stephen R. Mercer, Austin, TX (US); Steven W. Rogers, Austin, TX (US)

(73) Assignee: National Instruments Corporation, Austin, TX (US)

( * ) Notice: Subject to any disclaimer, the term of this patent is extended or adjusted under 35 U.S.C. 154(b) by 353 days.

This patent is subject to a terminal disclaimer.

(21) Appl. No.: 12/779,341

(22) Filed: May 13, 2010

(65) Prior Publication Data

US 2010/0251228 A1 Sep. 30, 2010

Related U.S. Application Data

(63) Continuation of application No. 11/269,217, filed on Nov. 8, 2005.

(60) Provisional application No. 60/630,482, filed on Nov. 23, 2004.

(51) Int. Cl.
G06F 9/45 (2006.01)
(52) U.S. Cl.
USPC ............ 717/141; 717/126; 717/140; 717/143
(58) Field of Classification Search .......................... None
See application file for complete search history.

(56) References Cited

U.S. PATENT DOCUMENTS

| 5,732,277 | A | 3/1998 | Kodosky et al. |
| 6,138,269 | A | 10/2000 | Ball et al. |
| 6,857,118 | B2 | 2/2005 | Karr et al. |
| 6,868,526 | B2 | 3/2005 | Singh |
| 7,086,040 | B2 | 8/2006 | Joisha et al. |
| 2001/0024211 | A1 | 9/2001 | Kudukoli et al. |
| 2002/0174418 | A1 | 11/2002 | Ruf |

OTHER PUBLICATIONS

Mattias Ericsson; "GOOP History by Mattias Ericsson"; Jul. 1, 2003; 2 pages; Retrieved from the Internet: <www.openg.org/tiki/tiki-index.php?page=GOOP+History+by+Mattias+Ericsson>.

(Continued)

*Primary Examiner* — H. S. Sough
*Assistant Examiner* — Kimberly Jordan
(74) *Attorney, Agent, or Firm* — Meyertons Hood Kivlin Kowert & Goetzel, P.C.; Jerry C. Hood; Mark S. Williams

(57) ABSTRACT

System and method for implicit downcasting at compile time in a data flow program. A first data flow function in an object-oriented dataflow program is identified, where the first function includes an input of a parent data type and an output of the parent data type. The first function is analyzed to determine if the output preserves the run-time data type of the input. A second dataflow function in the object-oriented data flow program is identified, where the second function includes a program element that calls the first function, passing an input parameter of a child data type of the parent data type as input. If the analysis determines that an output parameter returned by the output of the first function will always be of the child data type, the program element is automatically configured at compile time to always downcast the output parameter from the parent data type to the child data type at run-time.

19 Claims, 20 Drawing Sheets

OTHER PUBLICATIONS

Jorgen Jehander; "Graphical Object-Oriented Programming in LabVIEW"; Application Note 143; Oct. 1999; 16 pages; National Instruments Corporation; Austin, TX.

Jim Kring; "Open GOOP—a component framework"; Jun. 3, 2003; 36 pages.

Jeffrey Travis; "Introduction to LabVIEW: A Programming Environment for Scientists and Engineers"; Oct. 4, 2002; Prentice Hall; 7 pages.

Subroutine Declaration in Dataflow Program

Subroutine Invocation in Dataflow Program

TYPE PROPAGATION FOR AUTOMATIC CASTING OF OUTPUT TYPES IN A DATA FLOW PROGRAM

PRIORITY DATA

This application is a continuation of U.S. application Ser. No. 11/269,217, titled "Type Propagation For Automatic Casting Of Output Types In A Data Flow Program", filed Nov. 8, 2005, whose inventors are Stephen R. Mercer and Steven W. Rogers, which claims benefit of priority to U.S. Provisional Application Ser. No. 60/630,482, titled "Type Propagation For Automatic Casting Of Output Types In A Data Flow Program", filed Nov. 23, 2004, both of which are hereby incorporated by reference in their entirety as though fully and completely set forth herein.

FIELD OF THE INVENTION

The present invention relates to the field of computer programming using a data flow language, and more particularly to a system and method for type propagation for automatic casting of output types in a data flow program.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In the course of developing graphical programs, users may define new data types. For example, in some graphical programming systems, object-oriented programming (OOP) methodologies allow a user to create new data types, called "classes," by aggregating data elements of various existing types and writing functions that define the behavior of those aggregated elements. They also allow the user to derive new classes from existing classes, where a derived class, referred to as a child class, may "inherit" all of the data types (e.g., member elements), and functions or methods of the original class, referred to as a parent class, and may optionally also include additional data elements and/or methods or functions. This mechanism is called inheritance, and may facilitate specification and implementation of class hierarchies. Note that the term "child" refers to any descendent of a parent class, i.e., a direct descendent, or any descendent thereof, e.g., "grandchild", "great-grandchild", etc.

Additionally, in some OOP systems, objects in a class hierarchy may be "cast" from the object's class type to another class type in that object's class hierarchy or lineage.

This does not change any of the object's data, but merely changes how functions of the program view that data. Casting from a child class to any ancestor class, referred to as "upcasting", may be checked at compile time, thereby guaranteeing success at run time because all instances (objects) of the child class are inherently instances of the ancestor class. However, casting from a parent class to a child class, referred to as "downcasting", cannot be checked at compile time and thus may fail at run time, because a given instance of the parent class might have been earlier upcast from any of several child classes, or might be an instance of the parent directly. In most conditions, downcasting is an operation that must allow for these failures and thus cannot be guaranteed by a compiler.

Thus, changing from child class to parent class (upcasting) may be done implicitly in the code, even inserted on behalf of the user by the program without the user having to approve the upcast. However, when converting from a parent to a child (downcasting), the programmer generally must explicitly downcast the instance and check for possible errors.

FIG. 1 illustrates a simple example inheritance tree, according to the prior art. As FIG. 1 shows, a parent class may serve as a parent (or base) class for a first child class and a second child class. Thus, each child class inherits all the member data elements and methods of the parent, and may then include additional data elements and methods as specified.

FIG. 2 illustrates a Venn diagram of data instances, according to the prior art, where the data instances are based on the above parent and child classes. As FIG. 2 shows instances of the first child class and instances of the second child class are each subsets of instances of the parent class.

Thus, all instances of both child classes may be used as valid instances of the parent class, via upcasting. Said another way, any function that accepts a parent instance will accept a child instance because the child has all the functionality of the parent and can behave as the parent.

However, not every parent class instance may be used for a giving child class instance. Said another way, if a function accepts a "first child class", it cannot accept a parent instance because although that instance might be a "first child class" that was earlier upcast (and would therefore be valid), it might also be an instance of "second child class" or an instance of parent itself, neither of which can behave as a "first child". To pass such an instance, the programmer must explicitly request a downcast to "first child." If the actual data instance at run time is an instance of "second child," then the downcast will fail. The language must allow some way to for the programmer to detect and handle this error.

FIG. 3A illustrates an upcast operation, according to the prior art. As shown, the upcast operation is applied to a child instance, thereby producing a parent instance. A textual pseudocode (based upon the C++ language) example of this process is as follows:

```
ChildClass      *a = new ChildClass( );
ParentClass     *b;
b = Upcast<ParentClass*>(a);
```

As may be seen, an upcast function is explicitly invoked with the child class instance 'a' as input, and with the template indication of the target class (ParentClass), with the result that parent instance 'b' receives all of the attributes of child instance 'a' that are common with the parent class definition. In other words a parent class instance has been generated based on a child class instance.

FIG. 3B illustrates and implicit invocation of the up cast operation of FIG. 3A. As FIG. 3B shows, the child instance is converted to the parent instance implicitly, i.e., without an explicit invocation of the upcast operator.

The following is another textual pseudocode example illustrating the upcasting of FIG. 3B, i.e., where the upcast operation is implicit:

```
ChildClass      *a = new ChildClass( );
ParentClass     *b;
b = a;
```

Note that the upcast operation is performed implicitly as part of the assignment operation ("="). In other words, in assigning the value of 'a' to 'b', the child class instance is implicitly upcast to a parent class instance. Thus, the upcast operation may be performed by the development environment, e.g., by the compiler.

FIG. 4 illustrates an example downcast operation, according to the prior art. In this particular example, a downcast operator receives a parent class instance as input and generates one of two output pairs:

1. an instance of the first child class based on the input instance and no error or
2. a default instance of the first child class and an error.

Example functionality of the downcast operation of FIG. 4 is shown in the following pseudocode:

```
ChildClass          *a = new ChildClass( );
ParentClass         *b;
If (*b is instance of ChildClass)
    a = b;
    return noErr;
else
    a = DEFAULT_VALUE;
    return error;
```

Note that because of the decision regarding the nature of ParentClass instance 'b', this functionality cannot be performed implicitly. In other words, the compiler has no way of knowing whether 'b' will at run time in fact be an instance of a particular ChildClass or not, and so requires the programmer to specify the downcast operation explicitly. Thus, the downcast operation may not be performed by the development environment, e.g., by the compiler.

Consider a subroutine invocation in a data flow language. As is well known in the art of programming, in many procedural languages, parameters may be passed by reference (or pointer) and may thus serve as both input and output. However, in a data flow language, parameters are either input or output, never both. Now consider a subroutine that takes as input an instance of a parent class and provides as output a modified value of that class, where the output value is a modification, not a completely new instance. The input and output parameters of this substrate must both be of the parent class.

FIG. 5A illustrates an example subroutine declaration in a data flow program, according to the prior art. As FIG. 5A shows, in this example, a Modify function (e.g., a Modify function node) accepts a ParentClass instance as input, and returns a modified version of the Parent class instance as output, where, as may be seen, the input and output are separate and distinct.

An example pseudocode version of this data flow program subroutine declaration may appear thus:

ParentClass Modify(ParentClass input);

Note that, as with the graphical example of FIG. 5A, the input and output arguments are distinct from one another.

FIG. 5B illustrates an example invocation of the Modify function of FIG. 5A in a graphical data flow program, according to the prior art. As FIG. 5B shows, in the call to or invocation of the subroutine, a value of a child class may be passed in as the input. The compiler accepts this because upcasting (from child to parent) always succeeds. However, the compiler will not allow the result to be stored in a child class parameter, and thus, the programmer must catch the value and explicitly downcast it. Note that the downcast function also receives the child class as input to indicate the target class for the downcast operation. Thus, the output of the Modify function (modified child class instance) must be explicitly downcast (to a parent class instance) as shown.

The following is example pseudocode corresponding to the invocation of the Modify function of FIG. 5B, and also including the explicit downcast:

```
ParentClass     temp;
ChildClass      original;
ChildClass      modified;
Temp = Modify (original);
If (temp is of ChildClass)
    modified = temp;
Else
    Handle Error ( );
```

Because the subroutine returns a modified version of the original value, human analysis can quickly show that in this usage the downcast is guaranteed to succeed, and thus, no error will occur. However, prior art compilers have not had the analysis capabilities to realize this guarantee, and so it prevents the implicit downcast. The need to constantly downcast after each function call is a major impediment to working efficiently in an object-oriented data flow language.

Thus, improved systems and methods for type propagation in a data flow program are desired.

SUMMARY OF THE INVENTION

Various embodiments of a system and method for type propagation for automatic casting of output types in a data flow program, e.g., in a text-based or graphical data flow program.

A first data flow function, e.g., a first graphical data flow function or graphical sub-program, in an object-oriented data flow program may be identified as having inputs and outputs of a parent data type, e.g., of a parent class or object type. Note that in various embodiments, program elements called by the function may include one or more language primitives and/or calls to one or more functions, e.g., user-defined functions.

The first data flow function may be analyzed to determine the run-time relationship between the inputs and the outputs, e.g., input terminals and output terminals, and determine any outputs that preserve the run-time data type of the inputs. For example, each output parameter of the function may be checked to determine if it is related to the inputs in such a way as to guarantee that the output always results from modifying only the data value of that input without changing the underlying data type. The intent is to prove or confirm that the output's type at run time will always be the same as the input type. This is a primary feature of the invention.

A second data flow function, e.g., a second graphical data flow function, i.e., a second graphical program or sub-program, in the object-oriented data flow program may be identified as containing at least one call to the first function (e.g., the first graphical sub-program) where a parameter of a child data type of the parent data type is passed as input. In other words, the second data flow function contains a program element that makes or represents a call to the first function (e.g., contains a node that makes or represents a call to the first graphical sub-program, where the input terminal of the node may be wired with a data type that is a child data type of the parent data type). In that program element (e.g., node), the second function passes parameters to the inputs of the first data flow function. Note that if the inputs are of the parent data type, which the first function was written to accept, the function invocation may operate in a standard fashion, i.e., according to prior art approaches, whereas when the parameters passed as inputs of a child data type of the parent data type, the function invocation operates according to embodiments of the present invention, as described below.

Said another way, the first function has a specified input/output (I/O) interface with an input of the parent data type and an output of the parent data type, and the second function calls the first and provides an input parameter of the child data type for the input.

Note that in prior art approaches, because the first function has an output of the parent data type, the program element of the second function would also have an output of the parent data type. This is not a useful output for the second function, which is working with child data types. The second function would thus need to include further program elements after the call to explicitly downcast the output to the child data type if the second function were to continue working with the child data type. It is noted that in the prior art, neither the editing environment nor the compiler can determine whether the downcasting of this variable is guaranteed to be safe to do on behalf of the programmer. The frequency with which a programmer would have to include this explicit downcast in object-oriented data flow programming would be inconvenient, tedious, and error prone.

If the above analysis determines that the output parameter of the program element is not always of the child data type (i.e., is upcast to the parent data type), then a compiler error may be returned, i.e., an error condition may be indicated by the compiler. In most cases, this error may direct the programmer to include the explicit downcast, as in prior art approaches, and handle any error resulting from the downcast. In some cases, the first function (e.g., the first graphical sub-program) may be configured by the programmer to require that it support automatic downcasting. If the first function is so configured, then the compiler error may indicate that the first function itself must be modified until it passes the analysis test described above. In either case, the error may include information such as, for example, where the error occurred, and may include descriptive information indicating the nature of the error, e.g., an error code, or a textual description of the error condition.

If the output parameter of the first function (e.g., the output parameter of the first graphical data flow function or sub-program, i.e., the data on the output terminal) can be guaranteed to always be of the child data type, then the calling program element (e.g., node) in the second function may be automatically configured to downcast the output parameter from the parent data type to the child data type. In other words, if the analysis proves that the output parameter provided by the program element will always be of the child data type, even though the output is specified as of the parent data type, then the calling program element may be automatically configured to downcast the output parameter from the parent data type to the child data type. This automatic downcasting may be referred to as implicit downcasting.

Note that while the automatic configuration is performed at edit or compile time, the actual downcasting of the output parameter is performed (programmatically and automatically) at run-time, i.e., when the program element executes and returns the output parameter to the calling function.

Note that the method described above is generic to any type of data flow program, including text-based and graphical object-oriented data flow programs, such as, for example, Object-Oriented LabVIEW.

It should be further noted that in preferred embodiments, the method described above is performed at edit or compile time, e.g., just prior to, or as part of the compilation process. Thus, the techniques and processes described herein are preferably implemented as part of the programming development environment, e.g., the programming language, as opposed to being implemented by a user, e.g., user-written application code. In various embodiments, the techniques described herein may be implemented directly in the programming development environment code, e.g., as part of a compiler, or as a tool or plug-in that operates in conjunction with the programming development environment code. Note also that the method (as well as other techniques described herein) is performed programmatically, e.g., by program instructions executing on a computer. In other words, a program automatically performs the method without human intelligence directly guiding or performing the analyses and resulting actions.

BRIEF DESCRIPTION OF THE DRAWINGS

A better understanding of the present invention can be obtained when the following detailed description of the preferred embodiment is considered in conjunction with the following drawings, in which.

Figure 1:
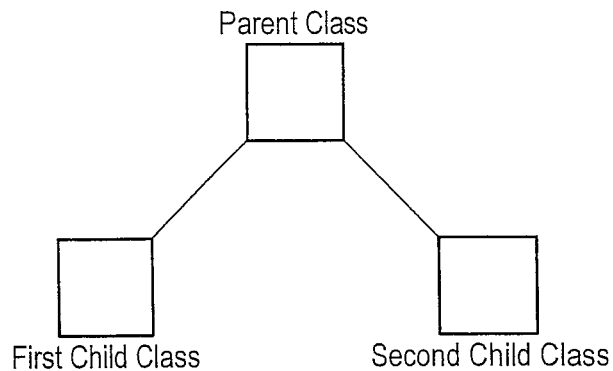
FIG. 1 illustrates an example inheritance tree, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Provisional Application Ser. No. 60/630,482, titled "Type Propagation For Automatic Casting Of Output Types In A Data Flow Program", filed Nov. 23, 2004.

U.S. Pat. No. 7,451,436, filed as application Ser. No. 10/995,441, titled "Aggregate Handling of Operator Overloading", filed Nov. 23, 2004.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117, published as Application Publication No. 20010020291 (Ser. No. 09/745,023) titled "System and Method for Programmatically Generating a Graphical Program in Response to Program Information," filed Dec. 20, 2000.

U.S. Pat. No. 5,901,221, titled "Graphical System for Modeling a Process and Associated Method", filed Apr. 14, 1986.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Data Type—a classification of a particular type or representation of information. Data types may be intrinsic to a programming language, e.g., integer, character, etc., and/or user-defined, such as, for example, AccountRecord, ChannelName, and so forth. Data types can be atomic, i.e., specifying a single, simple data object, such as an integer, or may be compound, such as an array of integers, a character string, or a user-defined type that includes multiple data elements of the same or different data types. A data type definition specifies the size of an element of that type, e.g., 16-bits, as well as the structure of the element, e.g., the order and content of a compound data type. A data type is a type of data, not the data itself, i.e., data elements of a data type must be instantiated.

Class—a form of compound data type that may specify an ordered list of component data types, and may also include methods (e.g., member functions) that may access and/or operate on the components. In some systems, classes may be heritable, i.e., a "child" class may inherit component data types and methods from a "parent" class, and may add data and/or add to or modify the methods as desired. A class (definition) defines a type of data or object, and is not the object itself, i.e., objects of a class must be instantiated.

Array—a sequential list structure that includes a variable number of one or more data elements. These elements may be all of the same type (a homogenous array) or of differing types (a heterogeneous array). When the elements are of differing types, there is generally some common parent type from which all the element types are derived, such that the array can be said to be a homogenous array of that common parent type. For example, a list of dogs may include many types of dogs, such as German shepherds, Cocker Spaniels and Dalmatians.

Cluster—a structure that includes a fixed number of multiple data elements, optionally of different data types.

Aggregate—a collection of data elements, e.g., an array or cluster.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument (VI) using a graphical user interface, e.g., a front panel.

A graphical program may optionally have a GUI associated with the graphical program. In this case, the plurality of interconnected nodes are often referred to as the block diagram portion of the graphical program.

Wire—a graphical representation of data communication between syntax elements in a graphical program. For example, the plurality of nodes or icons in a graphical program may be interconnected by wires. A wire may have or be associated with a data type that indicates the data type of data being communicated over the wire.

Source—the origin of a signal or data, e.g., of a wire. Data flows from a single source along the wire to one or more sinks.

Sink—the destination of a signal or data, e.g., of a wire.

Wire Data Type—the set of all types that may flow down the wire. This type information is known at compile time.

Data Data Type—the type of the data that actually does flow down the wire at run time.

Ultimate Source—a source whose type value at run-time is not determined by upstream data. A more detailed description is provided below.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Note that every node in a graphical program has one or more terminals that represent the inputs and outputs of that node. The terminals may be sources and/or sinks for respective wires, thereby coupling the node to other nodes. A node's input terminals are sink terminals for wires connecting those input terminals to upstream nodes, since they are the destinations of those wires (which provide data to the node), while the node's output terminals are source terminals for wires connect those output terminals to downstream nodes, since they are the sources of data for those wires.

Data flow Graphical Program (or Data flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 6A:
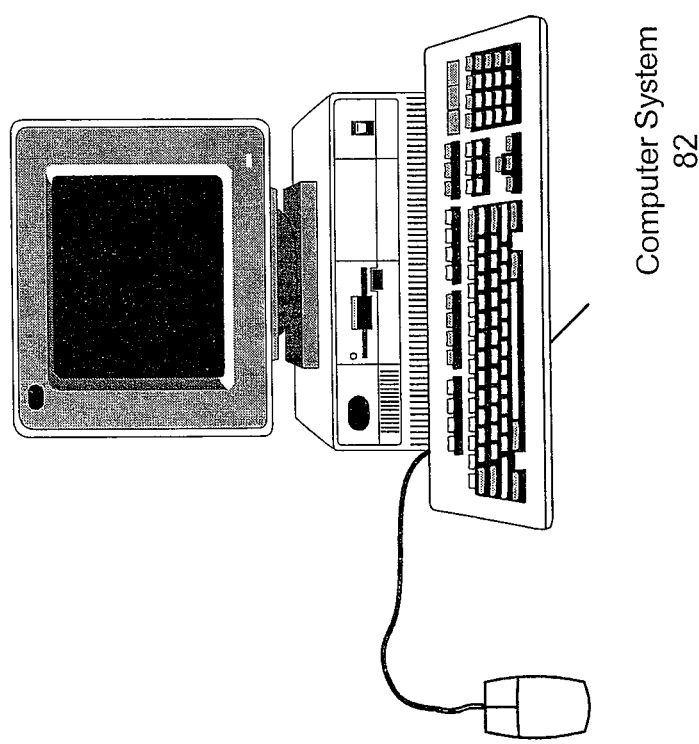
FIG. 6A illustrates a computer system operable to execute a graphical program according to an embodiment of the present invention.

FIG. 6A—Computer System

FIG. 6A illustrates a computer system 82 operable to various embodiments of the invention described herein. Various embodiments of a method for configuring a wire appearance in a graphical programming environment is described below.

As shown in FIG. 6A, the computer system 82 may include a display device operable to display a graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 6B:
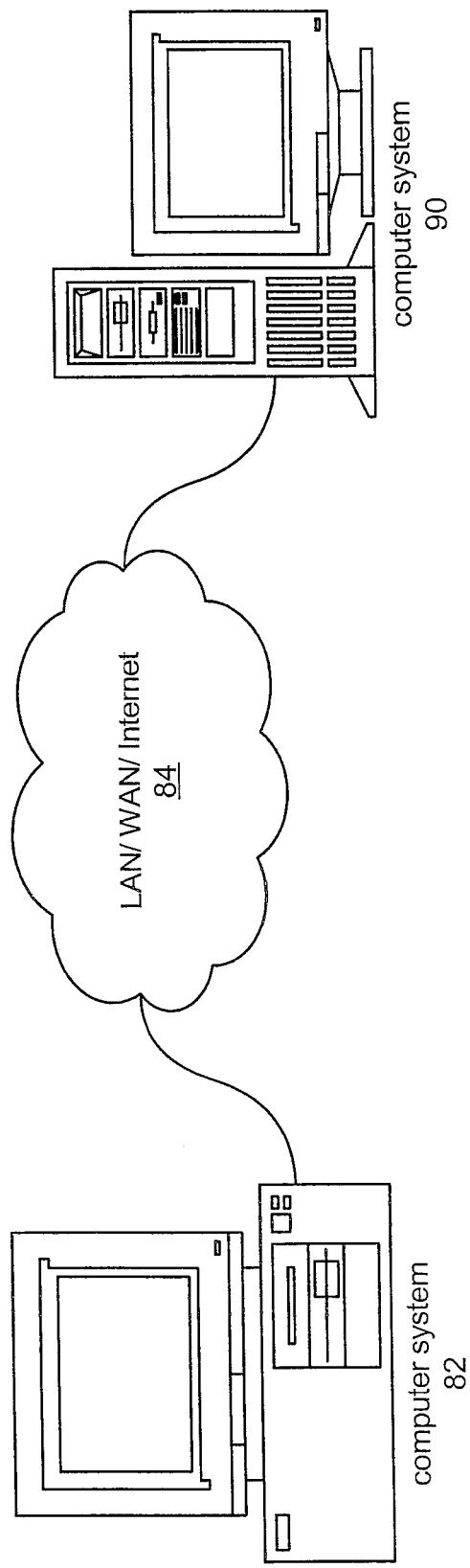
FIG. 6B illustrates a network system comprising two or more computer systems that may implement an embodiment of the present invention.

FIG. 6B—Computer Network

FIG. 6B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device connected to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 7A:
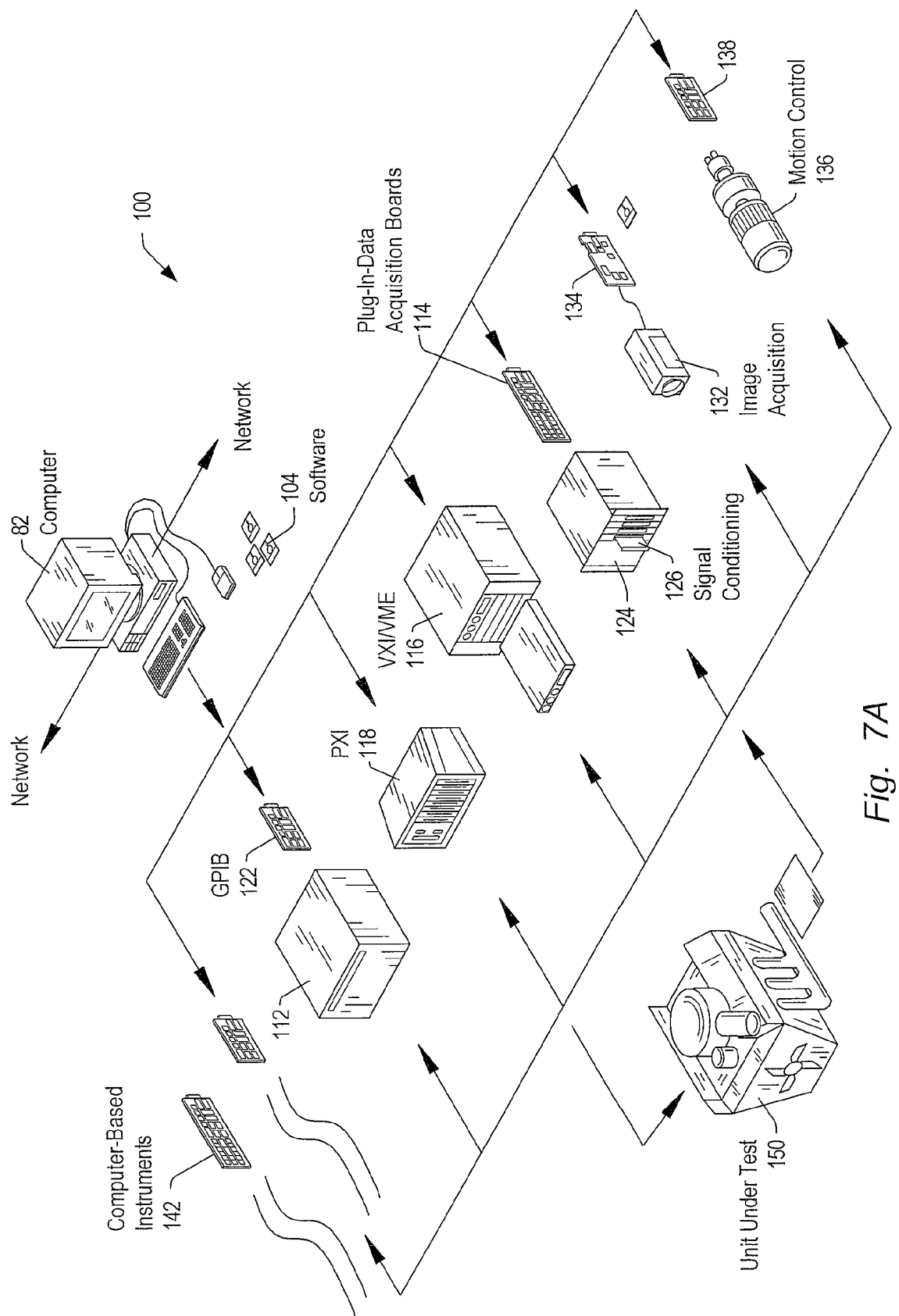
FIG. 7A illustrates an instrumentation control system according to one embodiment of the invention.

FIG. 7A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 7B:
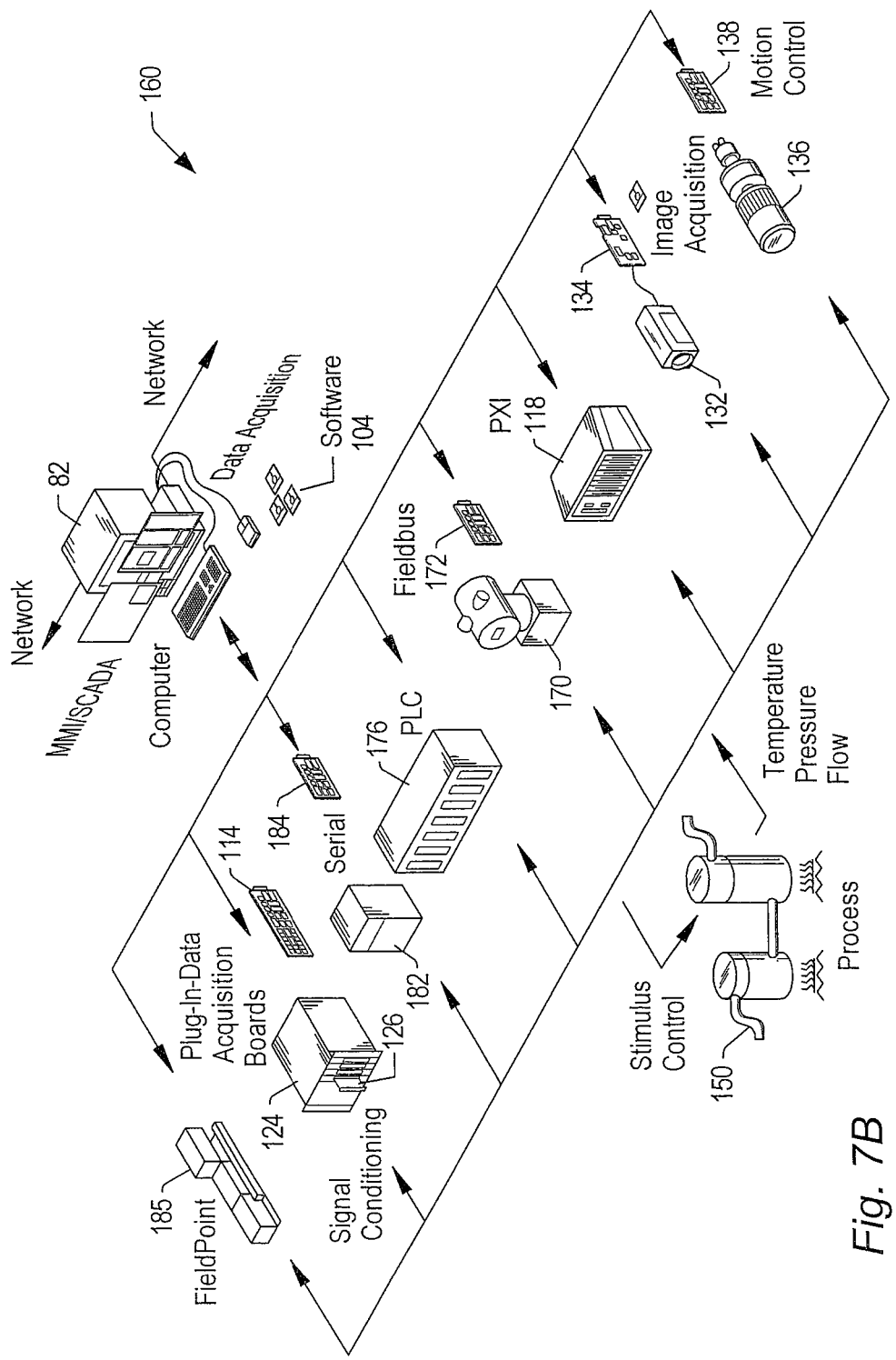
FIG. 7B illustrates an industrial automation system according to one embodiment of the invention.

FIG. 7B illustrates an exemplary industrial automation system 160 which may implement embodiments of the invention. The industrial automation system 160 is similar to the instrumentation or test and measurement system 100 shown in FIG. 7A. Elements which are similar or identical to elements in FIG. 7A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, exemplified by a FieldPoint device 185, among other types of devices.

Figure 8A:
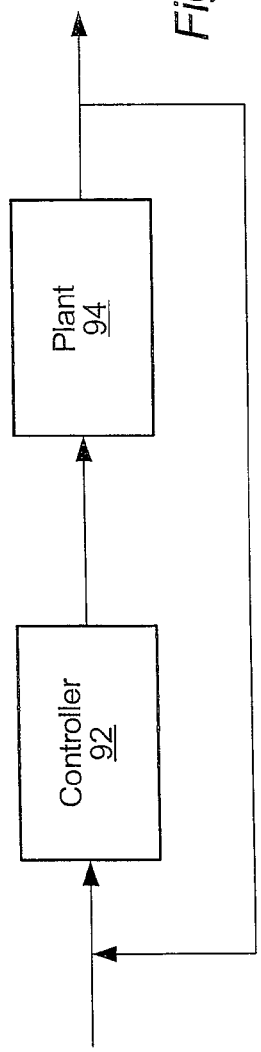
FIG. 8A is a high-level block diagram of an exemplary system which may execute or utilize graphical programs.

FIG. 8A is a high level block diagram of an exemplary system which may execute or utilize graphical programs. FIG. 8A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 8B:
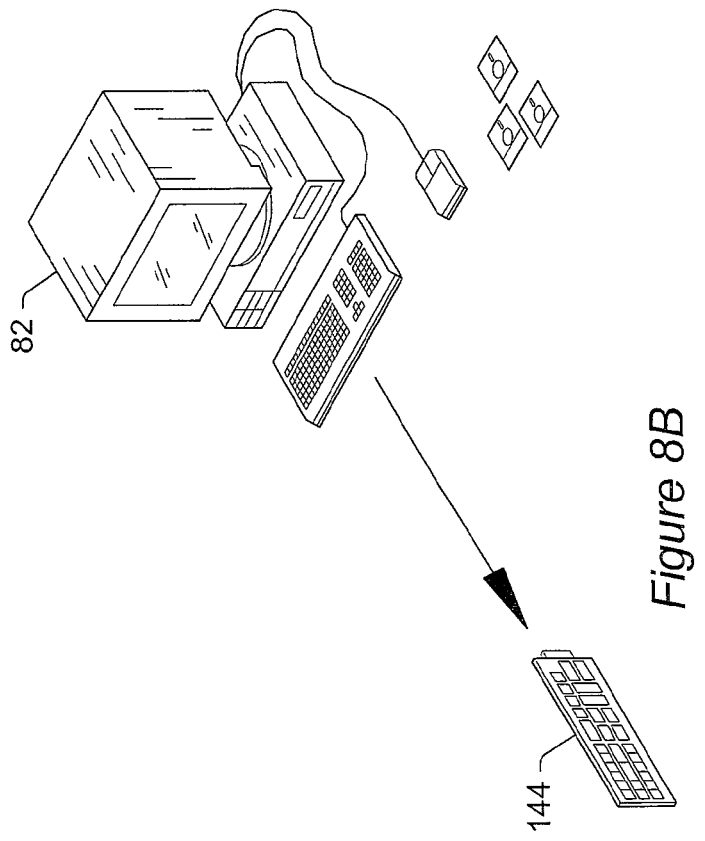
FIG. 8B illustrates an exemplary system that may perform control and/or simulation functions utilizing graphical programs.

FIG. 8B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

Figure 2:
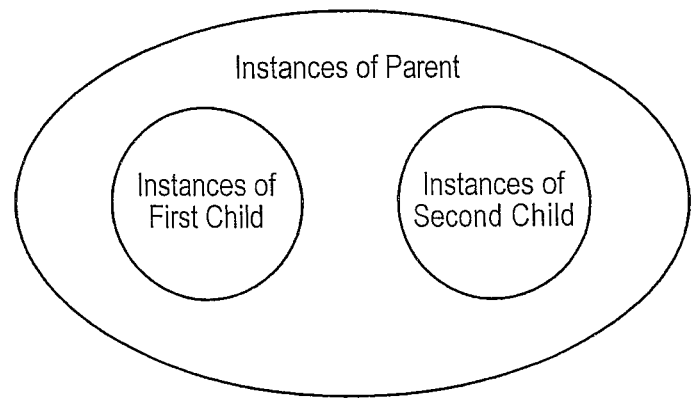
FIG. 2 illustrates an example Venn diagram of class instances, according to the prior art.
Figure 3A:
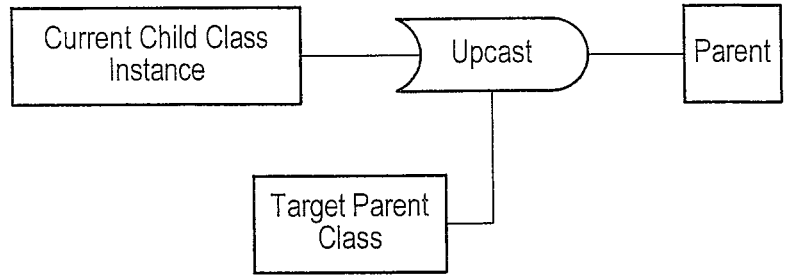
FIG. 3A illustrates an example graphical explicit upcast operation, according to the prior art.
Figure 3B:
FIG. 3B illustrates an example graphical implicit upcast operation, according to the prior art.
Figure 4:
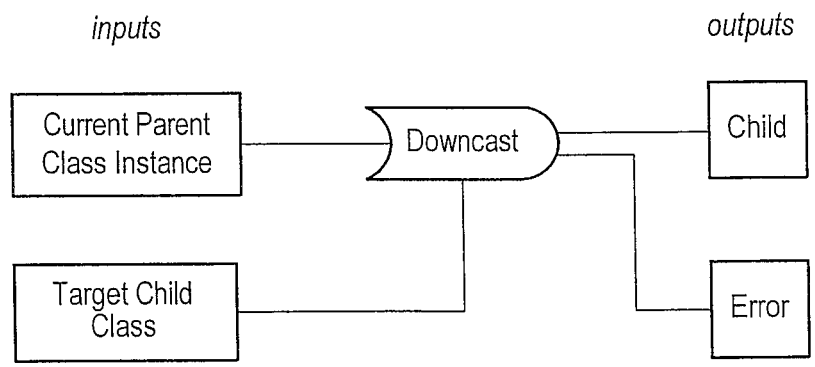
FIG. 4 illustrates an example graphical explicit downcast operation, according to the prior art.

In the embodiments of FIGS. 2A, 2B, and 8B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments (VIs).

Figure 9:
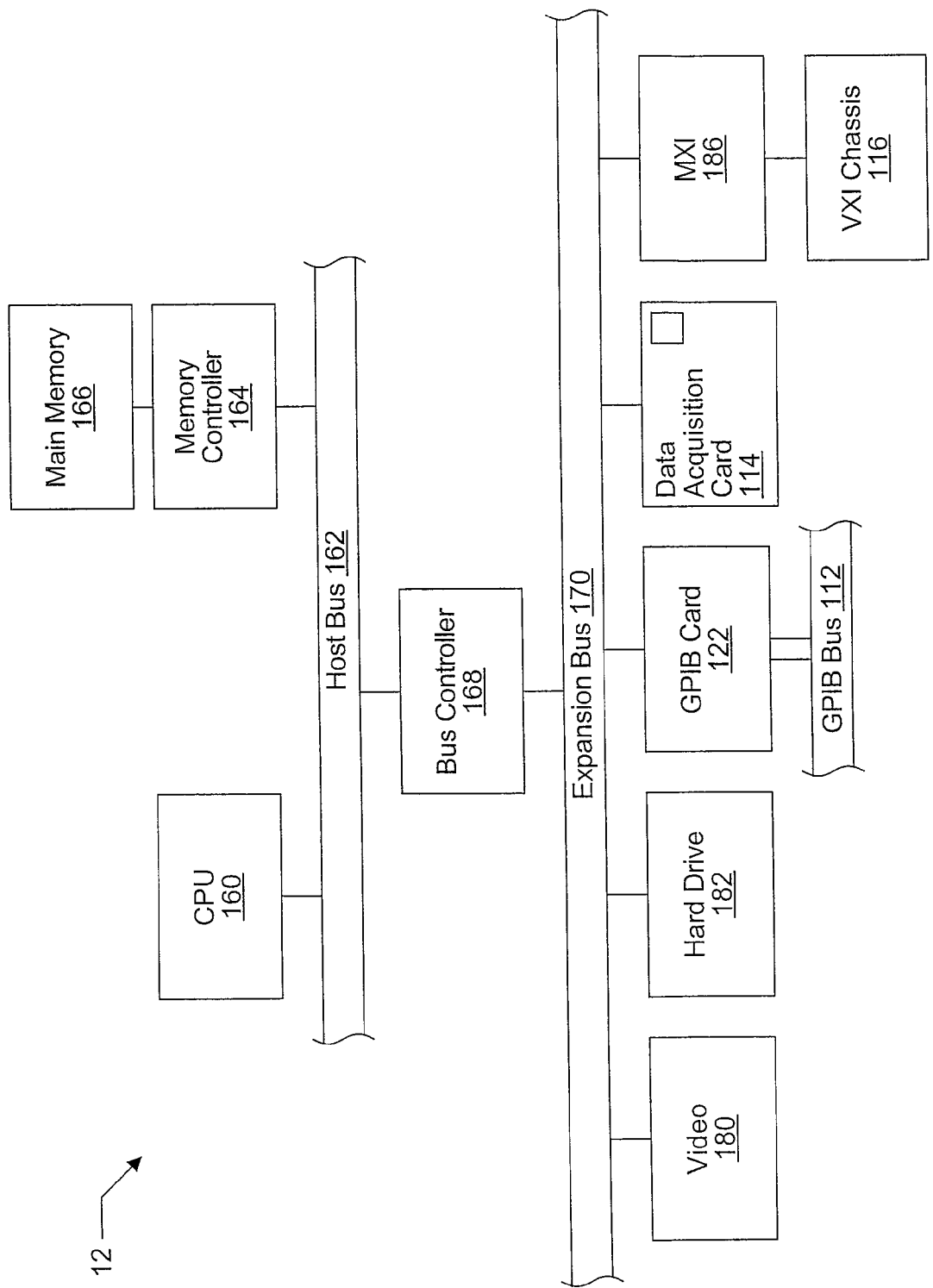
FIG. 9 is an exemplary block diagram of the computer systems of FIGS. 6A, 6B, 7A and 7B and 8B.

FIG. 9—Computer System Block Diagram

FIG. 9 is a block diagram 12 representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 9 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs, e.g., graphical programs, implementing various embodiments of the techniques described herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

A device may also be connected to the computer. The device may include a processor and memory which may execute a real time operating system. The device may also or instead comprise a programmable hardware element. The computer system may be operable to deploy a graphical program to the device for execution of the graphical program on the device. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 10A:
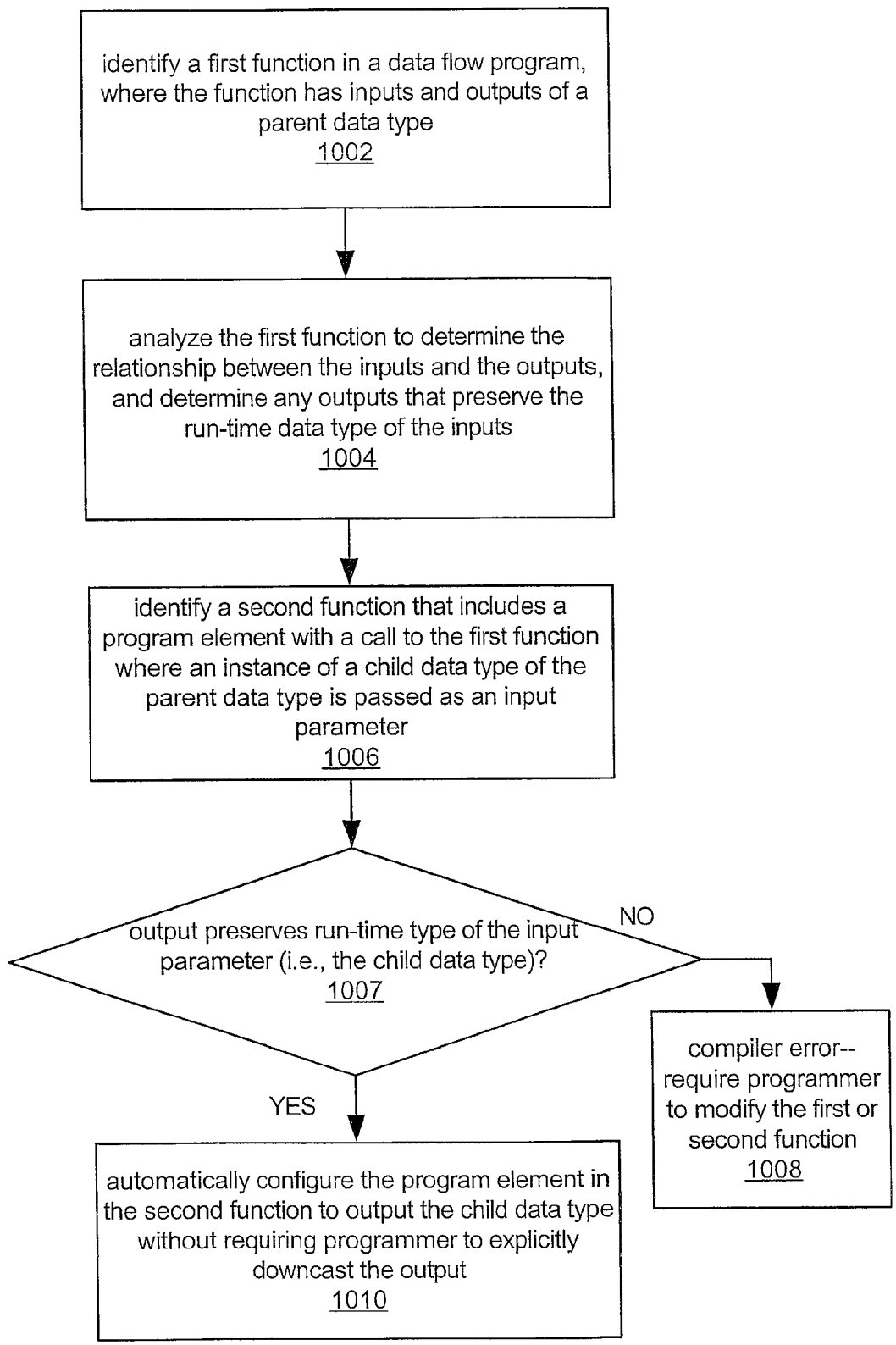
FIGS. 10A and 10B flowchart embodiments of a method for type propagation for automatic casting of output types in a data flow program.

FIG. 10A—Type Propagation for Automatic Casting of Output Types in a Data Flow Program FIG. 10A illustrates one embodiment of a method for type propagation for automatic casting of output types in a data flow program. The method shown in FIG. 10A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

As FIG. 10A shows, in 1002, a first function in an object-oriented data flow program may be identified as having inputs and outputs of a parent data type, e.g., of a parent class or object type. Note that in various embodiments, the first function may include one or more language primitives and/or calls to one or more functions, e.g., user-defined functions.

In 1004, the first function may be analyzed to determine the run-time relationship between the inputs and the outputs, and determine any outputs that preserve the run-time data type of the inputs. For example, each output parameter of the function may be checked to determine if it is related to the inputs in such a way as to guarantee that the output always results from modifying only the data value of that input without changing the underlying data type. The intent is to prove or confirm that the output's type at run time will always be the same as the input type. This is a primary feature of the invention.

In 1006, a second function in the object-oriented data flow program may be identified as containing at least one call to the first function where a parameter of a child data type of the parent data type is passed as input. In other words, the second function contains a program element that makes or represents a call to the first function, where the second function passes parameters to the inputs of the first function, and where an instance of the child data type is passed as an input parameter. Note that if the inputs are of the parent data type, which the first function was written to accept, the function invocation may operate in a standard fashion, i.e., according to prior art approaches, whereas when the parameters passed as inputs of a child data type of the parent data type, the function invocation operates according to embodiments of the present invention, as described below.

Said another way, the first function has a specified input/output (I/O) interface with an input of the parent data type and an output of the parent data type, and the second function calls the first and provides an input parameter of the child data type for the input.

Note that in prior art approaches, because the first function has an output of the parent data type, the program element of the second function would also have an output of the parent data type. This is not a useful output for the second function, which is working with child data types. The second function would thus need to include further program elements after the call to explicitly downcast the output to the child data type if the second function were to continue working with the child data type. It is noted that in the prior art, neither the editing environment nor the compiler can determine whether the downcasting of this variable is guaranteed to be safe to do on behalf of the programmer. The frequency with which a programmer would have to include this explicit downcast in object-oriented data flow programming would be inconvenient, tedious, and error prone.

In 1007, if the analysis of 1004 determines that the output parameter of the program element is not always of the child data type (i.e., is upcast to the parent data type), then a compiler error may be returned, as indicated in 1008. In most cases, this error may direct the programmer to include the explicit downcast, as in prior art approaches, and handle any error resulting from the downcast. In some cases, the first function may be configured by the programmer to require that it support automatic downcasting. If the first function is so configured, then the compiler error may indicate that the first function itself must be modified until it passes the analysis test of 1004. In either case, the error may include information such as, for example, where the error occurred, and may include descriptive information indicating the nature of the error, e.g., an error code, or a textual description of the error condition.

If in 1007, the output parameter of the first function can be guaranteed to always be of the child data type, then in 1010, the calling program element in the second function may be automatically configured to downcast the output parameter from the parent data type to the child data type.

In other words, if the analysis of 1004 proves that the output parameter provided by the program element will always be of the child data type, even though the output is specified as of the parent data type, then the calling program element may be automatically configured to downcast the output parameter from the parent data type to the child data type. This automatic downcasting may be referred to as implicit downcasting.

Note that while the automatic configuration of 1010 is performed at edit or compile time, the actual downcasting of the output parameter is performed (programmatically and automatically) at run-time, i.e., when the program element executes and returns the output parameter to the calling function.

Figure 10B:
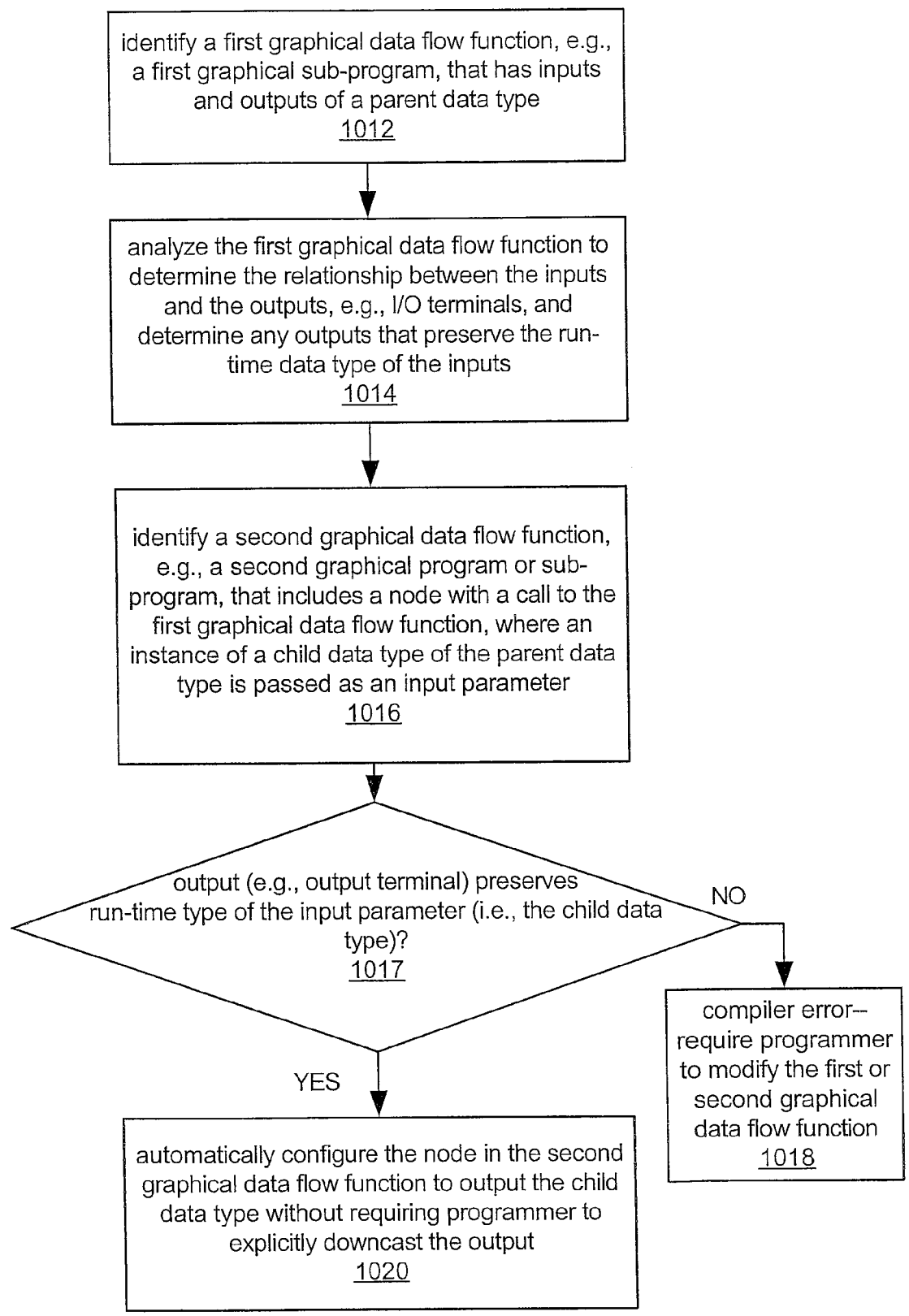

Note that the method of FIG. 10A is generic to any type of data flow program, including text-based and graphical object-oriented data flow programs. FIG. 10B, described below, illustrates an embodiment of the method of FIG. 10A directed to a graphical object-oriented data flow, e.g., Object-Oriented LabVIEW.

FIG. 10B—Type Propagation for Automatic Casting of Output Types in a Graphical Data Flow Program FIG. 10B illustrates one embodiment of a method for type propagation for automatic casting of output types in a graphical data flow program. The method shown in FIG. 10B may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that although the method elements of FIG. 10B are described in terms of an object-oriented graphical data flow program, the techniques disclosed herein are broadly applicable to any type of object-oriented data flow programming language, compiler, or environment.

As shown, this method may operate as follows.

As FIG. 10B shows, in 1012, a first graphical data flow function, i.e., a first graphical sub-program comprised in a graphical program, may be identified as having inputs and outputs, e.g., input and output terminals, of a parent data type, e.g., of a parent class or object type. In other words, the function has some mechanism for specifying its inputs and outputs, where at least one input and one output are of the same parent data type. Note that as defined above, a graphical data flow function, i.e., a graphical program (or graphical sub-program) includes a plurality of interconnected nodes that visually indicate functionality of the graphical data flow function (program or sub-program).

In 1014, an analysis of the input terminals and output terminals of the function identified in 1012 may be performed to determine the run-time relationship between the class outputs and the class inputs. This analysis may include reviewing all of the interconnected nodes included in the function to identify any outputs that preserve the run-time data type of the inputs. In other words, as described above with respect to FIG. 10A, each output of the function may be checked to determine if it is related to the inputs in such a way as to guarantee that the output always results from modifying only the data value of that input without changing the underlying data type.

In 1016, a second graphical data flow function, i.e., a second graphical program or sub-program, may be identified which contains a node that represents or makes a call to the first function (i.e., the first graphical sub-program), where the input parameter of the call (e.g., the input terminal of the node) may be wired with a data type that is a child data type of the parent data type, where, as described above, the parent data type is the type the first function is designed to receive as input. In other words, an instance of the child data type is passed as an input parameter. Note that the call (node) accepts the input since all child data types may freely connect to parent input terminals.

Thus, the first graphical sub-program may have a specified input/output (I/O) interface with an input terminal of the parent data type and an output terminal of the parent data type, and the second graphical program (or sub-program) may call the first, providing an input parameter of the child data type for the input terminal.

Similar to the above described 1006 of FIG. 10A, it should be noted that if the inputs are of the parent data type, which the first function was written to accept, the function invocation may operate in a standard fashion, i.e., according to prior art approaches, whereas when the parameters passed as inputs of a child data type of the parent data type, the function invocation operates according to embodiments of the present invention, as described below.

In 1017, if the analysis of 1014 determines that the output parameter (e.g., terminal) of the node is not always of the child data type (i.e., is upcast to the parent data type), then a compiler error may be returned, as indicated in 1018. As described above, in most cases, the error may direct the programmer to include the explicit downcast, as in prior art approaches, and handle any error resulting from the downcast, while in some cases, the first graphical data flow function (i.e., the first graphical sub-program) may be configured by the programmer to require that it support automatic downcasting. If the first graphical data flow function is already configured in this way, then the compiler error may indicate that the first graphical data flow function itself must be modified until it passes the analysis test of 1014. As noted above, in either case, the error may include information such as where the error occurred, as well as descriptive information indicating the nature of the error, e.g., an error code, or a textual description of the error condition.

If in 1017, the output parameter of the first graphical data flow function or sub-program (i.e., the data on the output terminal) can be guaranteed to always be of the child data type, then in 1020, the calling node in the second graphical data flow function or sub-program may be automatically configured to downcast the output parameter from the parent data type to the child data type.

In other words, if the analysis of 1004 proves that the output parameter provided by the node will always be of the child data type, even though the output is specified as of the parent data type, then the calling node may be automatically configured to downcast the output parameter from the parent data type to the child data type, which, as noted above, may be referred to as implicit downcasting.

As also noted above, while the automatic configuration of 1020 is performed at edit or compile time, the actual downcasting of the output parameter is preferably performed (programmatically and automatically) at run-time, i.e., when the node executes and returns the output parameter to the calling function (i.e., to the first graphical sub-program).

It should be noted that in preferred embodiments, the methods of FIGS. 10A and 10B are performed at edit or compile time, e.g., just prior to, or as part of the compilation process. Thus, the techniques and processes described herein are preferably implemented as part of the programming development environment, e.g., the programming language, as opposed to being implemented by a user, e.g., user-written application code. In various embodiments, the techniques described herein may be implemented directly in the programming development environment code, e.g., as part of a compiler, or as a tool or plug-in that operates in conjunction with the programming development environment code. Note also that the methods of FIGS. 10A and 10B (as well as other techniques described herein) is performed programmatically, e.g., by program instructions executing on a computer. In other words, a program automatically performs the method without human intelligence directly guiding or performing the analyses and resulting actions.

FIGS. 11-14, described below, illustrate various embodiments of graphical data flow diagrams illustrating operation and use of the techniques described above with reference to FIG. 10B. It should be noted, however, that the techniques disclosed herein are broadly applicable to any type of data flow language, be it graphical, textual, or any other type of data flow language. Note that an exemplary data flow language is the LabVIEW G graphical programming language provided by National Instruments Corporation, although any other data flow languages are also contemplated.

Figure 11:
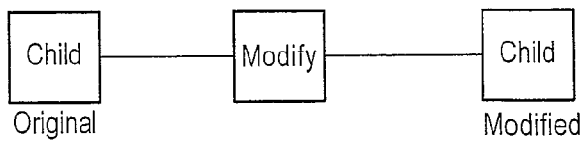
FIG. 11 illustrates an exemplary graphical subroutine invocation with automatic downcasting, according to one embodiment.

FIG. 11—Graphical Subroutine Invocation with Automatic Downcasting

FIG. 11 illustrates one embodiment of a graphical subroutine invocation, where the subroutine is automatically analyzed and a determination is made as to whether automatic downcasting of the output may be guaranteed. As FIG. 11 shows, a Modify function (node) receives a child instance as input, modifies the instance, and outputs a modified child instance. Similar to the Modify function of FIG. 5B, the Modify function of FIG. 11 is specified to receive a parent class as input and outputs a parent class. Note that whereas the prior art invocation of FIG. 5B required explicit downcasting of the output (parent instance), as well as an extra input, in the invocation of FIG. 11, the output of the Modify function is downcast implicitly. In other words, although no explicit downcast from parent class to child class is performed, the Modify function of FIG. 11 returns a (modified) child instance.

The following is example pseudocode corresponding to the graphical subroutine invocation of FIG. 11.

```
ChildClass original;
ChildClass modified;
modified = Modify (original); // No Error!
```

Figure 5A:
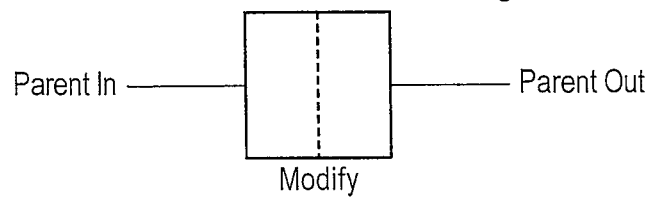
FIG. 5A illustrates an example subroutine declaration in a data flow program, according to the prior art.
Figure 5B:
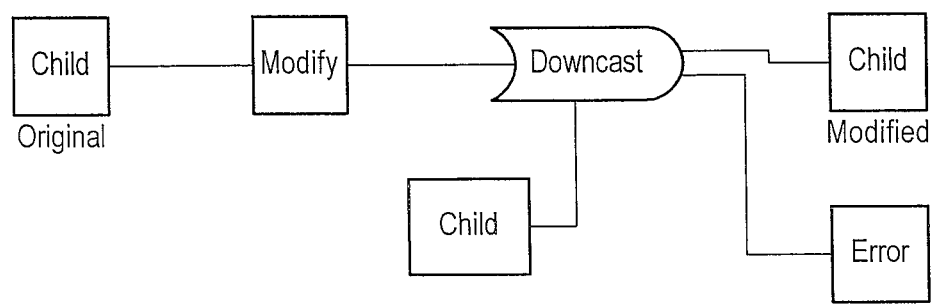
FIG. 5B illustrates an example subroutine invocation in a data flow program, according to the prior art.

Note the simplicity of the pseudocode as compared to that corresponding to the invocation of FIG. 5B.

Figure 12A:
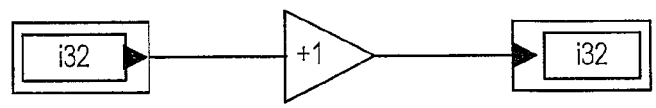
FIG. 12A illustrates a wire data type, according to one embodiment.
Figure 12B:
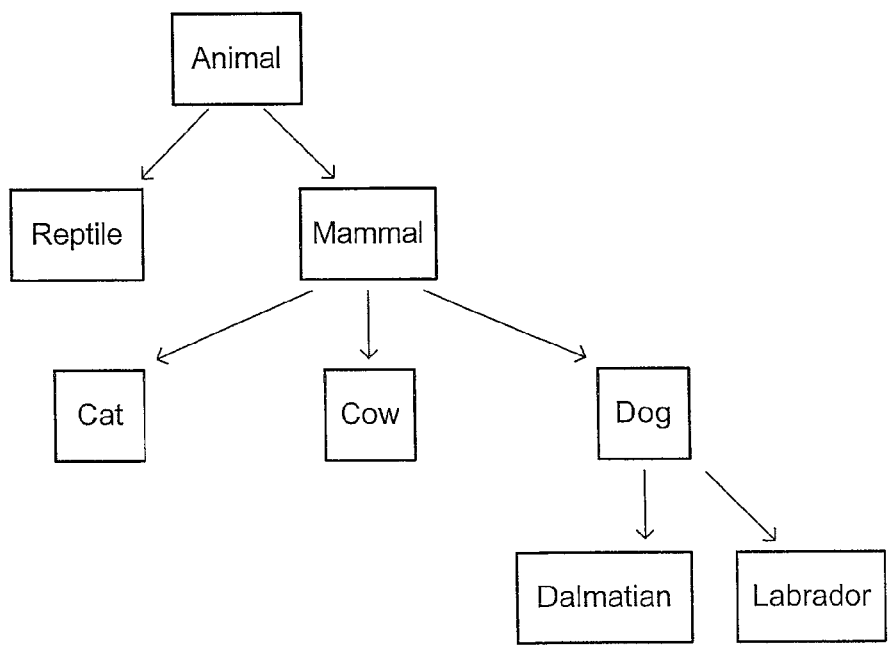
FIG. 12B illustrates a class inheritance hierarchy, according to one embodiment.
Figure 12C:
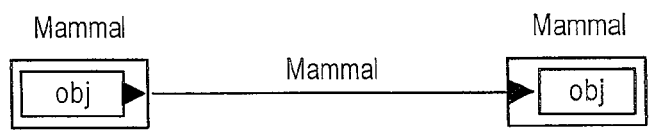
FIG. 12C illustrates data types of wires and data, according to one embodiment.

FIGS. 12A-12C—Data Type of Wire vs. Data Type of Data on the Wire

In graphical data flow programs, such as LabVIEW graphical programs or block diagrams, nodes have input and/or output terminals for data input and output. A wire connecting two terminals has a type indicating the type of data that may flow down that wire. In most case, one and only one type of data may flow down a given wire.

For example, as illustrated in FIG. 12A, a wire of type "32-bit integer" may always have 32-bit integers as its data. In other words, the wire is operable to transmit only data of its type, where "data" and "data type" refer to non-class data.

With classes the situation is slightly different. A wire of class Parent may indeed carry data of class Parent, but may also carry data of any descendant of class Parent. When one class inherits from another, the child class may be passed along to any element or place where the parent could go. FIG. 12B illustrates a class hierarchy where a base class Animal has two child classes, Reptile and Mammal. Mammal itself has three child classes, Cat, Cow, and Dog, which are all grandchildren of Animal. As shown, Dog has two child classes, Dalmatian and Labrador.

Referring now to FIG. 12C, two nodes are shown with an interconnecting wire of type Mammal. Note that a wire of class Mammal (based on the hierarchy of FIG. 12B) may carry data of all types shown except Animal and Reptile. Thus, with respect to the wire of FIG. 12C, the "wire data type" is the set of all types that may flow down the wire. This type information is known at compile time. The "data data type" for the wire is the type of the data that actually does flow down the wire at run time.

Figure 13:
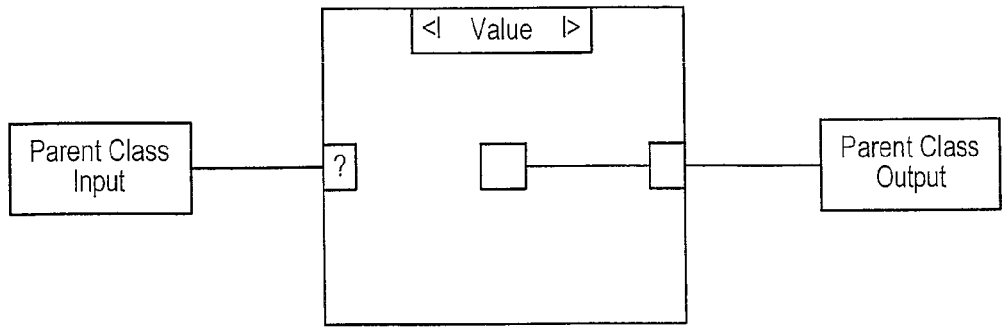
FIG. 13 illustrates run-time type safety with respect to a function, according to one embodiment.

FIG. 13—Run-Time Type Safety of a Function

When a subroutine is written which takes a class as an input, that subroutine may evaluate and/or modify that value using any of the methods defined for that class. An output form the subroutine of the same type as the input may be either the original input value modified in some way or a completely new value with no relation to the input.

For example, consider two subroutines that both take an input class Animal and output an Animal. The first uses the input Animal, sets its color to green, then outputs the Animal. The second determines if the input Animal is green. If so, the input value is output, otherwise a green cat is the output.

In the first subroutine, no matter what creature is passed in at run time, that same creature is returned as output. Attributes of the creature are modified, but the type—the class—of the creature is preserved. A blue cow in yields a green cow out. The second subroutine sometimes return the same input, but a blue cow in gives a green cat out. The output wire type is "Animal" for both subroutines. However, the first subroutine preserves the underlying child class information of the input, while the second subroutine does not.

When invoking a subroutine, it may be desirable automatically downcast outputs of the subroutine to match the types of the inputs. Only outputs that preserve the underlying type of the input can be automatically downcast. Not all subroutines guarantee this type safety. For example, consider the function of FIG. 13. This example graphical data flow function receives a parent class input, and outputs a parent class. Although the input is used in determining the value of the output, the output value is not some modification of the original. There is no type relationship between the input and the output. Thus, if the function of FIG. 13 were called as a subroutine, it would not be acceptable to assume that the output could be safely downcast to match the input type.

The key issue is whether child class information carried on a parent class wire will ever be lost. If that information is lost at any node in the chain, then run-time type safety cannot be guaranteed for the subroutine as a whole. However, if all nodes in the chain preserve type information, then the subroutine can guarantee run-time type safety and thus automatic downcasting can be performed for the caller of the subroutine.

Proving Run-Time Type Safety

In a diagram of given function, preferably there are nodes that represent input and output parameters of the function. Other nodes in the diagram generally represent either calls to sub-functions (i.e., sub-routines) or, for structure nodes such as loops, may direct the flow of control. A node may have zero or more terminals. These terminals are inputs and outputs for the function or subroutine represented by or comprised in the node. The terminals may be connected to each other by wires (also referred to as signals), which determine and implement the flow of data from one node to the next.

Figure 14:
FIG. 14 illustrates input and output front panel terminals, according to one embodiment.

FIG. 14—Front Panel Terminals

In LabVIEW, nodes that represent parameters of a function are referred to as "front panel terminals" or FPTerminals. As described above, a front panel is type of graphical user interface (GUI) that includes input controls and output indicators, and which enables a user to interactively control or manipulate the input being provided to a program, and view output of the program, while the program is executing. A front panel may be associated with a graphical program.

FIG. 14 illustrates respective FPTerminals for an input parameter and an output parameter. Note that FPTerminals preferably have a single terminal. As FIG. 14 shows, these example FPTerminals represent 32-bit integers. In some embodiments, these terminals are associated with respective controls or indicators on a front panel. An ellipsis shown between the input and output FPTerminals denotes zero or more interconnected graphical program nodes coupled between the FPTerminals.

The general goal in proving run-time type safety is to prove
1. that at least one path exists from an input FPTerminal to the output FPTerminal (passing through various nodes along the way);
2. that no path to the output FPTerminal exists that does not begin at the input FPTerminal; and
3. that all nodes on the connecting paths themselves preserve the input run time type.

Figure 15:
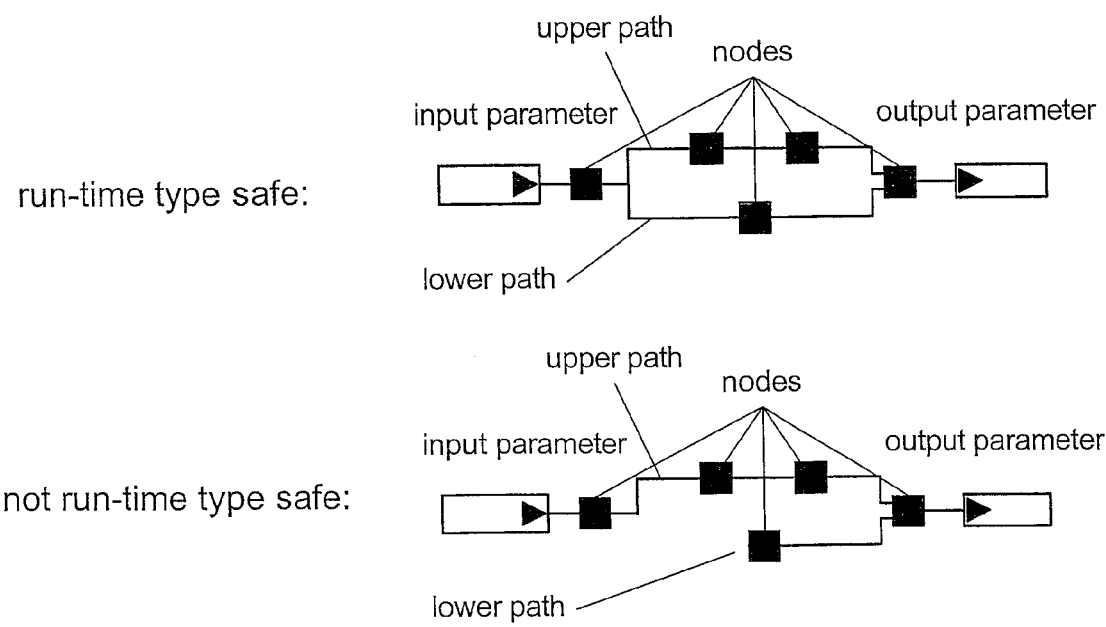
FIG. 15 illustrates example function diagrams, according to one embodiment.

FIG. 15—Example Function Diagrams

FIG. 15 illustrates example function diagrams where a plurality of interconnected nodes, represented by black filled squares, are interposed between input and output FPTerminals. As FIG. 15 shows, the FPTerminals and nodes are connected by wires that may form various signal or data paths, possibly running from the input FPTerminal to the output FPTerminal.

These paths may be programmatically traversed (i.e., by a program) to determine whether all paths in a diagram which terminate at the output FPTerminal originate at the input FPTerminal (a subroutine may include many paths that go to other places than the output FPTerminal—these are not of interest to run time type safety for that output FPTerminal). This is the first step in the proof listed above.

It should be noted that in various embodiments, a function diagram may comprise one or more of: source code, e.g., graphical source code, e.g., a block diagram, for the function; a data structure encoding the diagram, e.g., a directed heterogeneous graph; and descriptive information specifying the diagram, e.g., specifying data flow through the function, e.g., (in the case of a graphical program) the terminals, nodes, node interconnectivity, structures, etc., among others. Thus, traversing the diagram may include traversing, parsing and/or analyzing any of various data structures, diagrams, or other information specifying the diagram.

As indicated in FIG. 15, the top diagram includes an upper and a lower path, each of which couple the input FPTerminal to the output FPTerminal, and no path that does not. Thus, the top diagram indicates that the represented function or graphical program is run-time type safe.

In contrast, the bottom diagram can be seen to include an upper path coupling the input FPTerminal to the output FPTerminal. However, as FIG. 15 also shows, this diagram also includes a lower path to the output FPTerminal that is not begin at the input FPTerminal. Thus, the function represented by the bottom diagram is not run-time type safe.

It should be noted that proving such run-time type safety is complicated by the fact that each node type has different rules for whether or not it preserves the run time type of its inputs in determining its outputs. FIG. 15 merely demonstrates the simplest case where it is assumed that all inputs are object inputs and that all are somehow relevant to the output object.

Traversal of Function Diagrams

As used herein, the term "source" refers to the origin of a signal, i.e., of a wire, while the term "sink" refers to a destination of a signal, i.e., of a wire. A signal (i.e., wire) on a function diagram preferably connects a single source terminal (e.g., function input) to one or more sink terminals (e.g., function output). Thus, data flows along the wire from a single source to one or more sinks Example sources include but are not limited to: Input FPTerminals and outputs from subroutine calls, among others. Example sinks include but or not limited to: Output FPTerminals and inputs to subroutine calls, among others.

As used herein, the phrase "ultimate source" is used to describe part of the analysis process. As noted above, source terminals (or, in the case of text-based programs, inputs and outputs) whose type value at run-time is not determined by upstream data may be referred to as "ultimate sources". Said another way, in graphical data flow programs, the term "ultimate source" refers to source terminals whose type value at run-time is not determined by upstream data on the current block diagram.

The phrase "on the current block diagram" is important in understanding the intended scope for the word "ultimate." The data of any given source terminal must originate from somewhere. In the case of a subroutine's FPTerminals, the data originate from outside the function (passed in as parameters) and are present at the moment the function begins execution. However, for the analysis described herein, data sources beyond the subroutine are not considered. It is intended that within the subroutine there be no place on the subroutine's block diagram where the value of an input terminal can be modified prior to the FPTerminal sending its data down the wire connected to it. Thus, the input FPterminal is the ultimate source for the data as far as the subroutine is concerned.

Outputs from a subfunction (i.e., a subroutine or subVI) call may or may not be ultimate sources. For example, some subfunction outputs are "in place" to the inputs, meaning that the output actually shares memory with a given input. In this case, the output terminal is not the ultimate source for its resultant data; the ultimate source for these data lies somewhere upstream, and from that ultimate source the data propagate down wires to the subfunction input terminal. Other subfunction outputs may be created inside the subfunction, and while subfunction inputs may be used to calculate the output values, the output types are not determined by or from any particular input or set of inputs. Outputs that do not set their run-time type based on the inputs are considered ultimate sources for the purposes of the present invention. Such an output would be the output of FIG. 13 if the function shown in FIG. 13 was called as a subroutine.

As noted above, the distinction of "ultimate" is made in the context of the function scope. Thus, input FPTerminals are ultimate sources, as are terminals for diagram constants. As also noted above, outputs from subroutines are considered ultimate sources when their type at run time is not determined by any of the inputs. Any subroutine output that is not itself an ultimate source has the same ultimate source as some set of input terminals. An unwired input terminal is its own ultimate source.

In traversing a function's diagram, for each terminal on that diagram, the set of terminals that ultimately define the run-time type for the terminal may be determined. In one embodiment, the traversal proceeds downstream (from the input FPTerminal), processing the nodes in the same order as that in which the nodes would execute. In a preferred embodiment, a diagram may be analyzed for run-time type safety in and via the same traversal as type propagation, in which each wire and terminal is checked for type compatibility with the other connected terminals. When the traversal reaches the output FPTerminal, if the only ultimate source for that FPTerminal is another FPTerminal, and if that other FPTerminal is an input parameter, then run-time type information is preserved between the two terminals.

In one embodiment, the traversal of a diagram includes generating and maintaining a map of each terminal to a set of terminals that are that terminal's ultimate sources. Recall the definition of "node" given earlier that a node's input terminals are a wire's sink terminals and a node's output terminals are a wire's source terminals.

Beginning with FPTerminals and those nodes with all input terminals unwired (they do not need to wait for any upstream data), the traversal may encounter and process each node in the diagram. For each terminal on the node, an entry will be added to the map. Each ultimate source terminal on a node records a map entry with itself as its only ultimate source. Each non-ultimate source terminal records a map entry with those inputs it depends upon as its ultimate sources. From these initial nodes and FPTerminals, the traversal follows the wires leading from each node's output terminals (the wires' source terminals) to downstream nodes via the wire's sink terminals (the downstream nodes' respective input terminals). In other words, the wires in the diagram propagate from source terminals (e.g., node output terminals) to various sink terminals (e.g., downstream node input terminals). The sink terminals of these wires (i.e., the input nodes of the downstream nodes) may be added to the map with the same ultimate sources as the respective source terminals of the wires (i.e., the ultimate sources as the output terminals of the node).

When all the sink terminals for a given node (i.e., that node's input terminals) have been added to the map, the source terminals from that node (i.e., that node's output terminals) may then determine their respective ultimate sources. As mentioned above, a given source terminal may depend on zero sink terminals, in which case it is an ultimate source and records itself in the map as such. Alternatively, the source terminal may depend on one or more sink terminals, in which case it records the union of the sets of ultimate sources for these sink terminals.

The traversal continues as described above until all nodes, terminals, and wires in the diagram have been processed.

Described in a slightly different way, in one embodiment, the traversal may be performed thusly:

```
for each input FPTerminal
    add that FPTerminal to the terminal map as its own ultimate source
for each node in the diagram that has no wired input terminals
    (a) for each output terminal of the node
        if the output terminal does not depend upon any inputs,
            it is added to the map listing itself
            as its own ultimate source;
        else
            set X to the "empty set"
            for each input that the output does depend upon
                Y = retrieve the ultimate sources for that input from
                the map and union that set of ultimate sources;
                X = X + Y; // set union
            Add the output terminal to the map with X as its set of
            ultimate sources.
        if a wire connects the output terminal to other nodes' inputs
            add each of those other nodes' input terminals to the map
            with X as their ultimate sources.
            Recursively process each of those nodes as described,
            beginning at step (a).
        if a wire connects the output terminal to an output FPTerminal
            add that terminal to the map with X as its ultimate source.
```

The above process continues until there are no more nodes and terminals to process on the diagram.

Note that in other embodiments, the traversal may be performed in a different order than described above. For example, as is well-known in the art, any recursive process may be performed as an iterative process. Thus, the above description of traversal is meant to be exemplary only, and is not intended to limit the manner in which the diagram is traversed to any particular technique or approach.

The generated map may then be used to programmatically determine whether the diagram is run-time type safe, i.e., by determining whether a path exists from the input terminal of the diagram to the output terminal of the diagram (passing through various nodes along the way) and whether no path to the output terminal exists that does not begin at the input terminal.

Case 1: If an output FPTerminal has any ultimate sources that are not FPTerminals or if it has zero ultimate sources, then that output does not preserve run time type of the inputs and callers of the function CANNOT do automatic downcasting.

Case 2: If an output FPTerminal is listed in the map as having one and only one input FPTerminal as its ultimate source, then the output FPTerminal preserves the run time type of that input FPTerminal. Callers of this function as a subroutine are therefore safe to automatically downcast the output to match whatever input is wired.

Case 3: If an output FPTerminal has more than one FPTerminal as ultimate sources, then the caller can perform automatic downcasting if and only if all the inputs in the caller function themselves have a single ultimate source (using the same analysis described above to determine this).

Figure 16A:
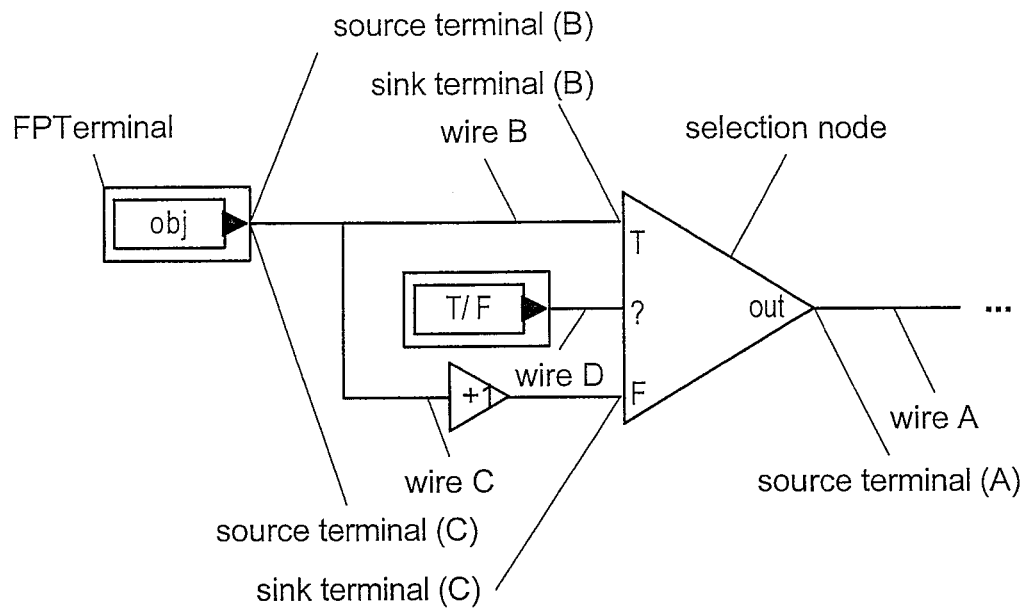
FIGS. 16A and 16B illustrate example source and sink terminals, according to one embodiment.
Figure 16B:
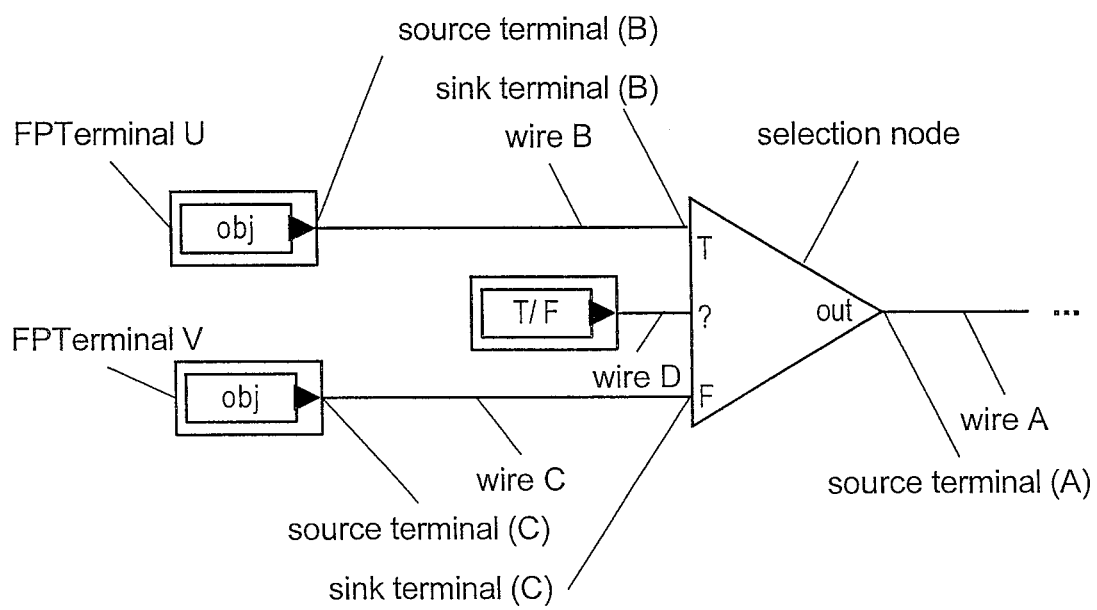

FIGS. 16A and 16B—Examples of Source and Sink Terminals

FIGS. 16A and 16B illustrate example block diagrams that demonstrate source and sink terminals. Note that these diagrams are meant to be exemplary only, and are not intended to limit the invention to any particular type of diagram or types of terminals.

As FIG. 16A shows, in this example, a selection node receives three inputs (at terminals labeled "T", "F", and "?") from wires B, C, and D, respectively. The source for wire D is a Boolean value (true or false). The source for both wires B and C is the same FPTerminal (labeled "obj"). That FPTerminal has a type of class X, meaning that at run time, the data coming from this FPTerminal will either be of type X or of some child class of X. Wires A, B, C and E are all of class X, which means they will carry data of type X or any child of type X. Wire C leads to an incrementer node (labeled "+1") that operates to change the value (but not the type) of data transmitted on wire C. It is presumed for this example that "+1" is a meaningful operation on a class X type.

The selection node operates to provide output to wire A based on the Boolean input D. More specifically, at run time, if the value coming in from wire D is true, then the value coming in on the "T" input will be output, and if the value from wire D is false, then the value arriving at the "F" input will be output. Both inputs originate at the same FPTerminal, though the value arriving at the "F" terminal has been incremented.

As described above, each wire has a source terminal and a sink terminal. Thus, the node's T, F, and ? terminals are sink terminals for wires B, C, and D, respectively, and the out terminal for the node (labeled "out") is a source terminal for wire A. The source terminal of wire A has its type dependent on the T and F sink terminals (e.g., class X). Because both sinks have the same ultimate source, the out terminal (source terminal of wire A) has only a single ultimate source. Thus, the ? terminal (associated with wire D) affects value, but not type, of the data output by the selection node (on wire A).

If wire A were connected to an output FPTerminal, that output FPTerminal would have a single ultimate source and that single ultimate source would be the input FPTerminal. Thus, if the function shown in FIG. 16A were called as a subroutine, that output could be automatically downcast in the caller to match whatever wire type is connected to the input.

In contrast, in FIG. 16B, the source terminals for wires B and C are not in common. Rather, wire B's source terminal is FPTerminal U, and wire C's source terminal is FPTerminal V, both labeled "obj". Both of these FPTerminals have the same class X that was used in FIG. 16A. Because they have the same type, the selection node will also have an output type of class X. This means that at run time, their data could be of class X or any child of class X. And there is nothing that guarantees that these two FPTerminals at run time will have the same run time type. Following the analysis described above, it may be seen that the out terminal of the selector node has two ultimate sources, FPTerminal U and FPTerminal V. Now the Boolean input from wire D can affect the type of data output onto wire A. For example, assume that FPTerminal U provides input of type X, while FPTerminal V provides input of type Y (a child of X). A received value of T (from wire D) results in output of data of type X on wire A, while a received value of F (from wire D) results in output of data of type Y. Thus, in this case, run-time type safety cannot be guaranteed in this function. If wire A were connected to an output FPTerminal, that output terminal would have two ultimate sources. Thus if a caller were to use the function shown in FIG. 16B as a subroutine, they would not be able to provide automatic downcasting unless (as described in Case 3 above) both inputs were wired from the same, single ultimate source in the caller diagram.

In summary: A sink terminal has the same set of ultimate sources as the source of the wire connected to the sink. If the sink terminal is not wired, it has itself as its ultimate source.

A source terminal is its own ultimate source if it depends on no other terminals for determining its run time type. If it does depend on other terminals, those terminals will all be sink terminals, and the source terminal's ultimate source is the union of all the ultimate sources for those sink terminals.

For simple nodes, this analysis is relatively straightforward. However, other node types nodes, such as structure nodes, may introduce additional complexities to the process.

Source and Sink Terminals with Structure Nodes

In some graphical programming development environments, nodes may be provided for controlling process flow in graphical programs. These nodes are referred to as structure nodes, and may implement such well-known program control structures as while loops, for loops, conditionals, case/switch structures, and so forth. Generally, the structure node includes a closed boundary, e.g., a thick-walled rectangle that encloses one or more graphical programming elements or nodes contained in the structure node, as well as input and output terminals for communicating with other programs or nodes outside the structure node.

In some embodiments, these structure nodes may complicate the above analysis regarding source and sink terminals. Note that in the below examples, input to a structure node is on the left of the node, and output on the right, although in other embodiments this may not be the case. For further information regarding structure nodes, please see U.S. Pat. No. 5,901,221, titled "Graphical System for Modeling a Process and Associated Method", which was incorporated by reference above.

Figure 17A:
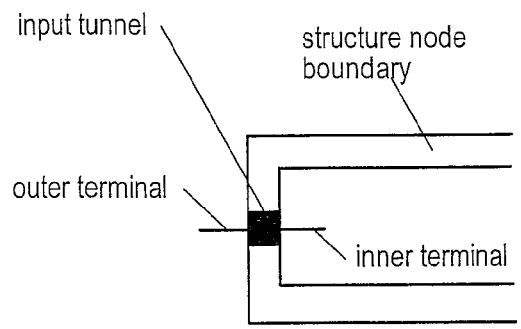
FIGS. 17A and 17B illustrate input and output tunnels for structure nodes, according to one embodiment.
Figure 17B:
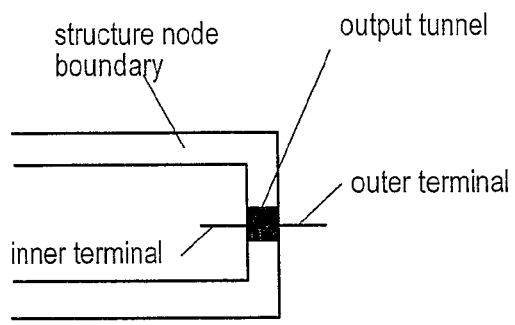

FIGS. 17A and 17B—Data Tunnels

FIGS. 17A and 17B illustrate input and output terminals, respectively, for use with structure nodes, according to one embodiment. Note that in each of FIGS. 17A and 17B, only a portion of a structure node boundary is shown. More specifically, FIG. 17A shows a portion of a structure node boundary at an input terminal for the structure node, and FIG. 17B shows a portion of a structure node boundary at an output terminal for the structure node.

Input Tunnels

FIG. 17A illustrates an input tunnel connecting an outer terminal and an inner terminal of the structure node, where the outer terminal provides connectivity of the structure node to program elements outside the structure node that provide input to the structure node, and where the inner terminal provides connectivity of the structure node to program elements inside the structure node. Note that in the case of loop structures, there may only be a single inner terminal, while for multi-frame diagrams, e.g., case or sequence structures, there may be multiple inner terminals.

The outer terminal for an input tunnel determines the ultimate source set for all inner terminals. In other words, all the inner terminals for an input tunnel receive their data from a single outer terminal, and so share any ultimate source or sources for that outer terminal.

Output Tunnels

FIG. 17B illustrates an output tunnel connecting an inner terminal and an outer terminal of the structure node, where the inner terminal provides connectivity of the structure node to program elements inside the structure node that provide output data from nodes enclosed in the structure to the structure node, and where the outer terminal provides connectivity of the structure node to program elements outside the structure node, e.g., for providing the output data to these elements. Note that the set of ultimate sources for the outer terminal of an output tunnel is the union of sets of ultimate sources for all inner terminals of the output tunnel.

Figure 18:
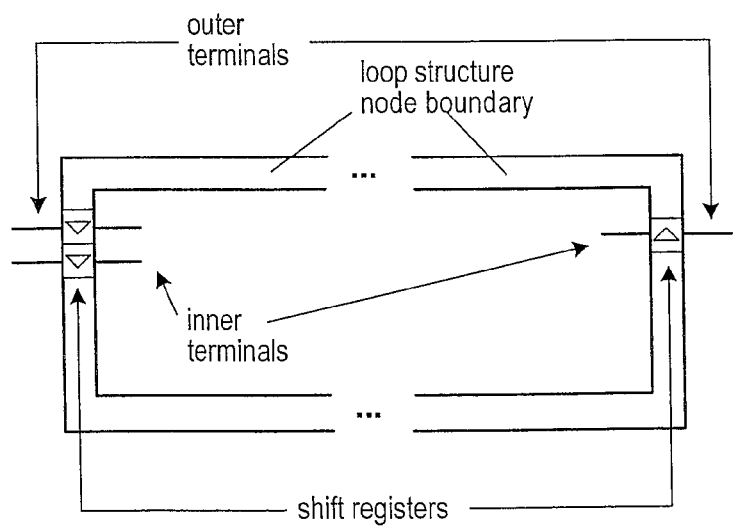
FIG. 18 illustrates shift registers used with a loop structure node, according to one embodiment.

FIG. 18—Shift Registers

In some embodiments, shift registers may be used for communicating results between successive iterations of loop structures. More specifically, shift registers may be present on boundaries of loop structure nodes, and may introduce feedback from one loop iteration to the next. For further information regarding the use of shift registers with structure nodes, please see U.S. Pat. No. 5,901,221, titled "Graphical System for Modeling a Process and Associated Method", which was incorporated by reference above.

FIG. 18 illustrates one embodiment of a loop structure node that utilizes shift registers for such inter-iteration communication. In the example shown in FIG. 18, input to the loop structure node is received from two outer terminals (and corresponding inner terminals) on the left side of the structure node, and output from the loop structure node is provided via the inner and outer terminals on the right side of the structure node.

Note that on the left side, the inner terminals all have the same set of ultimate sources: specifically, the union of sets of all outer terminals on the left side. On the right side, the ultimate sources include the union calculated on the left hand side plus the set of ultimate sources for the right-side inner terminal.

Zero-Iteration Loops

There are generally two types of loop structures: pre-test and post-test. The post-test loops are guaranteed to execute at least once because they test their stop condition at the end of each iteration. However, a pre-test loop does not provide this guarantee—it tests before each iteration, and if the test is false at the beginning, it will not execute at all, and thus may in some cases be a zero-iteration loop, which may pose a problem for a run-time type safety. Typically, the output value from a zero-iteration loop is the default value of the wire type. Thus, the resulting data (output from the loop) would be of Parent type for class wires, and all child type data would be lost. Run time type safety would then not be guaranteed.

One approach to this problem would be to disallow all pre-test loops unless the compiler can guarantee the loop will execute at least once. However, this approach blocks all counting loops (for i=1 to N . . . ) that have a variable specifying the number of iterations to perform unless that N is a hardwired constant. This is an unacceptable solution as it would stop automatic downcasting from working for a broad range of functions.

Alternatively, suppose a loop is analyzed and it is known that the loop—assuming it executes at least once—will preserve child type info and it only has a single ultimate source (Case 2, not Case 3). In one embodiment, the language definition (e.g., the behavior of loop structures) may be modified slightly such that when a loop executes zero times, the output tunnels get the default value of the run-time data type of their ultimate source. This has the effect of resetting values to a default value and preserving run-time type safety. Note that default values for a class type are easy to calculate, and are not dependent on actually executing the diagram. This approach makes pre-test loops useable with automatic downcasting.

Possible Restrictions on Output FPTerminals

Note that run-time type safety may only be guaranteed when data flows from the input FPTerminal to the output FPTerminal. Structure nodes affect the flow of control in the program. For example, case structures typically execute only one frame out of many. This may present problems if the output FPTerminal were in one of the non-executed frames, in that the FPTerminal would retain the value it had on the previous subroutine call, a value whose run-time type might not match the run-time type supplied at later calls. Similarly, an FPTerminal inside the boundary of a zero-iteration loop would have the same problem.

Under one considered solution, a check would be made for FPTerminals for which run-time type safety is desired to ensure they were outside of all pre-test loops with variable execution times (possibly zero), and also outside of all conditional structures. However, this distinction may difficult for users to understand and remember, and may require substantial effort to check for such conditions in code.

Another approach suggests that unexecuted output FPTerminals should be set to their ultimate source's default value, similar to the approach used for tunnels in zero-iteration loops. However, this approach may result in strange behavior where values change in frames that never executed, which may be difficult for users to understand.

Thus, to simplify these issues, in one embodiment, output FPTerminals for which run-time type safety is desired may be restricted to be outside all structures (i.e., structure nodes), which is easy to check and also much easier for users to understand. It should be noted, however, that this is but one example approach, and that less restrictive options and corresponding implementations are also contemplated and are considered to be within the domain of the present invention.

It should be noted that input FPTerminals do not require this restriction, unless the data flow language in question provides some way for a user to manually or programmatically modify a control's value during the execution of the subroutine. In such a language, input FPTerminals must be outside of all structures in order that their values propagate onto wires at the very beginning and thus avoid the impossible-to-reconcile case of multiple initial input run time types. The exemplary embodiment does include such language features, thus input FPTerminals are also required to be outside of all structures.

Guaranteed vs. Coincidental Run-Time Type Safety

In some embodiments, a mechanism may be provided for the user to specify that a given output FPTerminal must support automatic downcasting from a given input. This is the case mentioned earlier when discussing FIG. 10A, section 1008. After the diagram is traversed, the output FPTerminal may be checked, and if the only ultimate source listed in the resulting map for the output FPTerminal is the input FPTerminal, then the user's requirement is met. If not, the compile may terminate and report an error to the user that the run-time type is not preserved. Note that in some embodiments, the map generated during the traversal may contain enough information to determine which node merged another ultimate source into the flow (paths) leading to the output FPTerminal, thereby improving the error feedback to the programmer. If the programmer indicates that this function must support the automatic downcasting, compilation may generate errors for the function until the code is changed to support the request.

In some embodiment, typing an output to multiple inputs may also be supported. For example, in one embodiment, the respective types of the inputs may be analyzed and a common base class type determined and used as the default type of the output.

The above approach wherein run time type safety is forced upon a subroutine may be contrasted with coincidental run-time type safety, where, for example, after traversing a diagram, analysis shows that a given output FPTerminal may just happen to depend on exactly one ultimate source, where that source is an input FPTerminal. Note that the user did not require this to work, it just happens to do so. In this case, automatic downcasting may be performed for the calls into the function, thus benefiting the user with no additional necessary functionality. Note that with coincidental downcasting, the case of a single output tied to multiple inputs is automatically supported, in that if all inputs are themselves sourced at the same ultimate source, the automatic downcast will operate properly.

Dynamic Dispatching

Dynamic dispatching, e.g., "virtual dispatching" in C++, is a feature of some object oriented programming systems, where the decision of which version of a function to call is made at run time based on the input class. At compile time every version of a function that might get invoked must have the same call interface (also known as a "signature"). For automatic downcasting, a requirement that any required type propagation be set the same on all versions of the function may be enforced. For automatic downcasting to operate properly, the type propagation is preferably the same regardless of which version of the function is ultimately invoked at run time.

Coincidental type safety may be implemented for dynamic dispatch calls only if it coincidentally occurs on every version of the function. However, because a new child type added to the inheritance tree might provide a version of a function that does not have the same coincident properties, there is a danger that inheriting new classes may break existing code. To avoid this, in some embodiments, coincidental type safety on dynamic dispatched functions may not be supported or provided. Further, if the language supports dynamic loading of classes, then supporting coincidental type safety is impossible for dynamically dispatched functions since the compiler cannot guarantee that all dynamically loaded classes will have the same coincidence for the loaded class' implementations.

Thus, in some embodiments, type safety analysis may be performed at edit or compile time to ensure that a given function will have certain run-time properties. By guaranteeing that a function preserves type information between a given input FPTerminal (or set of terminals) and a given output FPTerminal (or set of terminals) the calls to that function may be modified so that use of a function that takes a Parent type as input may be wired with a child type without requiring tedious downcasting of the output, thereby simplifying the work of calling subroutines in an object-oriented data flow language.

Example Implementation

One embodiment of the present invention may be implemented in the LabVIEW graphical programming environment provided by National Instruments, although other development environments and languages may be used as desired. In the description below, a LabVIEW implementation is assumed, where, for example, a data flow diagram, referred to as a LabVIEW block diagram or Virtual Instrument (VI), may be used as a subroutine, referred to as a subVI. The block diagram typically has a front panel terminal (FPTerminal) representing or facilitating I/O between the block diagram and a front panel, i.e., the GUI for the block diagram.

As described in detail above, in an object-oriented graphical programming system, such as for example, Object-Oriented LabVIEW (OOLV), there are substantial benefits for guaranteeing that the run-time data type of the class output front panel terminal is the same as the run-time data type of one or more input front panel terminals. In other words, although the actual value of the data may be changed during the course of the VI's execution, the data's type (class) is preferably the same at the start and at the finish. Note that the data's type at run time is not the wire's type. Rather, at run time, a wire may carry any type of data that is the same as or a descendent of the wire type. At compile time, it may be desirable and beneficial to guarantee that regardless of what data comes in at runtime, no operations are performed on that data that result in a type change and that the data eventually flows through the diagram to the output dynamic front panel terminals.

When one terminal can be guaranteed to have the same run-time data type as another terminal, the one terminal may be "thralled" to the other, where a thrall refers to an entity that is something between a servant and a slave, and denotes the sort of freedom with dependence that the two terminals have in relation to each other.

In some embodiments, to prove that the input front panel terminal will successfully propagate at run time, strict data flow may be enforced. For example, in some embodiments, a property node may not be used to set the value of the front panel terminals, and the terminals are preferably on the top-level diagram, not in any structure node (guaranteeing that they will be read/written at least once and no more than once). Thus, the method may also include tracking where the wire branches and flows, and ensuring that some (possibly modified) copy of the original data arrives at the output front panel terminals.

In one embodiment, the wire branches may be traversed and tracked by maintaining a map of "single terminal to ultimate source terminal set". As the block diagram is compiled, each terminal encountered in the traversal may update the map to reflect what its ultimate source terminals are by retrieving the immediate source terminal's ultimate source set from the map and adding a new entry that maps the current terminal to that same set. At the end of the traversal, i.e., when the final output front panel terminal is reached, a check may be made to ensure that the ultimate source for the output front panel terminal is the desired input front panel terminal.

As described above in some detail, there may be various special cases where additional processing and/or structure may be needed, examples of which may include, but are not limited to:

Tunnels of case/event structures: An input tunnel preferably forks its original source to all tunnels on each frame of the case/event structure. Likewise, the output tunnel preferably collects all inputs from every frame and propagates them as a set. If the set contains more than one item, multiple original sources may be blended and thus downcasting for the output may not be guaranteed.

Zero iteration pre-test loops: If a for-loop iterates zero times, the output from its tunnels has been in the past the default value of the wire type. The language definition (possibly after modification) may specify that the output value for tunnels of class types will be the default value of the ultimate source's run time type (not its compile time type). This will preserve the run-time type across a zero iteration for-loop. Without this modification, classes would be effectively banned from use in any for-loop whose number of iterations is not constant and non-zero at compile time.

Feedback in loops: When encountering a shift register, the output shift register preferably merges the original source of the input shift register with the wire connected to the feedback terminal. Similar to the case with data tunnels, the original source of the input shift register and the wire connected to the feedback terminal preferably have the same original source to successfully guarantee downcast.

In preferred embodiments, a subroutine (e.g., subVI) that guarantees downcast on its own diagram may be used on a diagram of a new subroutine and still guarantee downcast.

In general, when multiple inputs lead to the same output, the inputs preferably all have the same original source to guarantee downcast. When multiple outputs depend on the same input, each output preferably knows to propagate the input's original source downstream.

Finally, in preferred embodiments, the map generation process (performed during the function diagram traversal) may support arbitrary mapping from inputs to outputs and may provide error feedback when error conditions occur, e.g., may provide information about where things went wrong, etc.

Figure 19A:
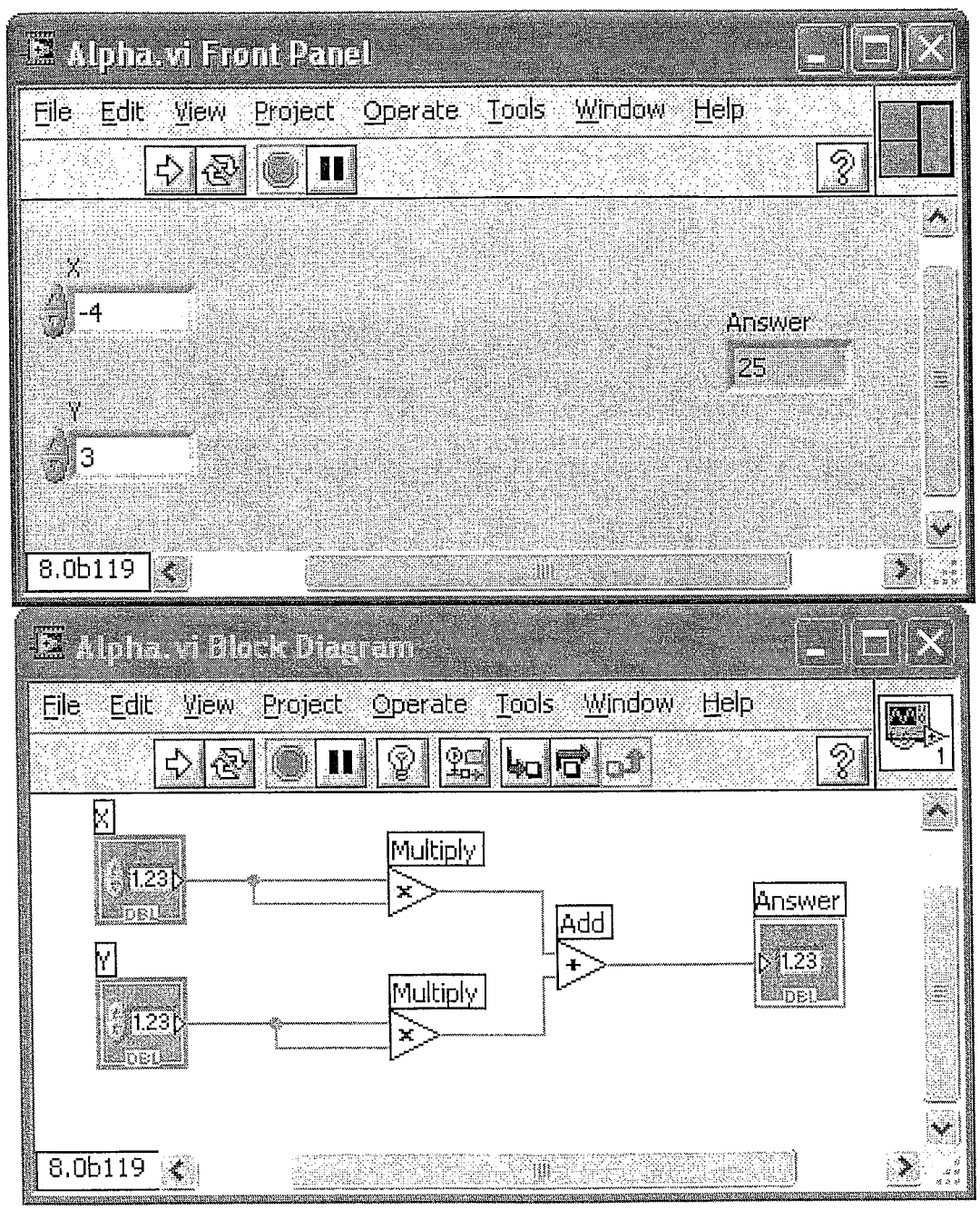
FIGS. 19A and 19B illustrate exemplary graphical programs and calling relationships, according to one embodiment.
Figure 19B:
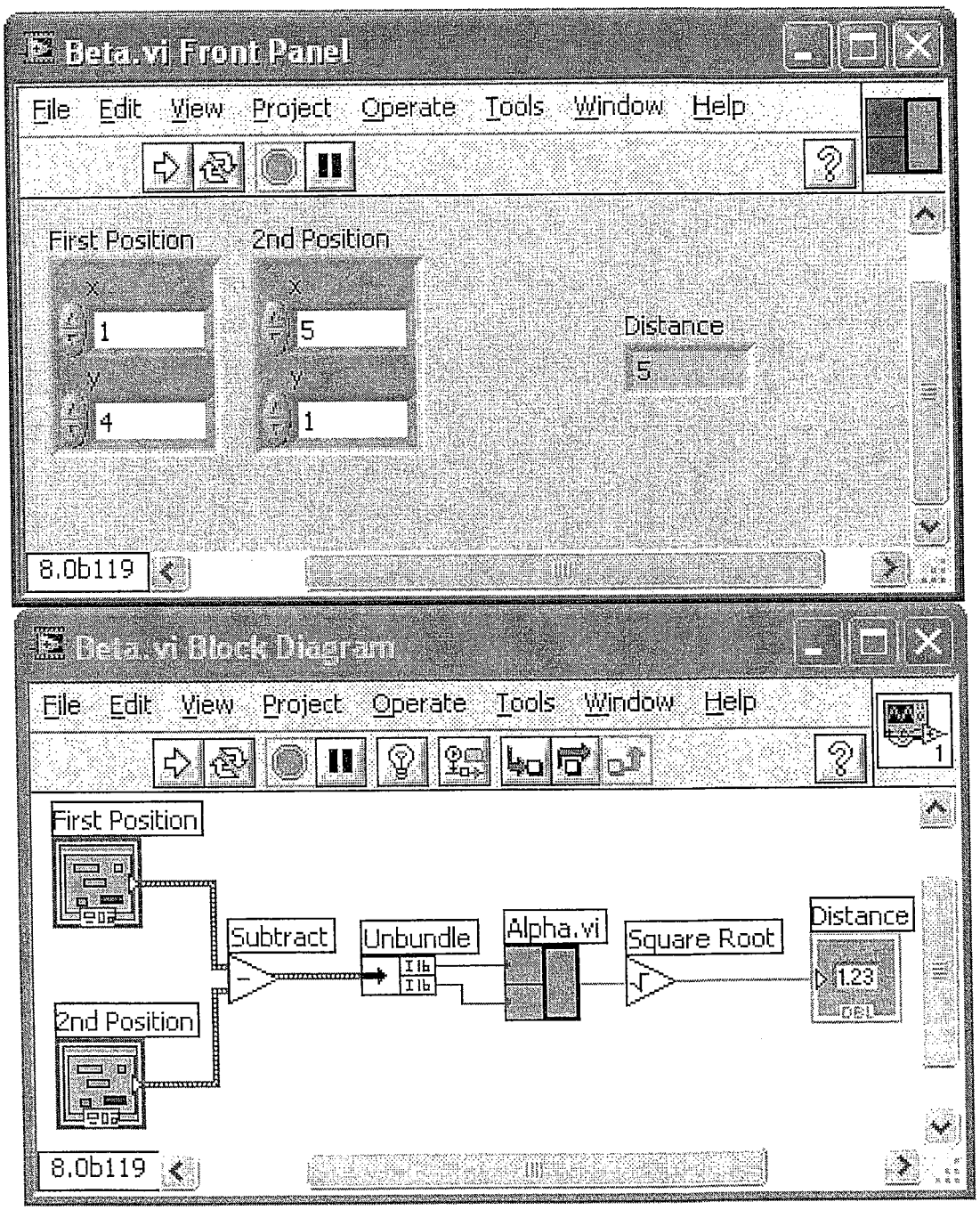
Figure 20A:
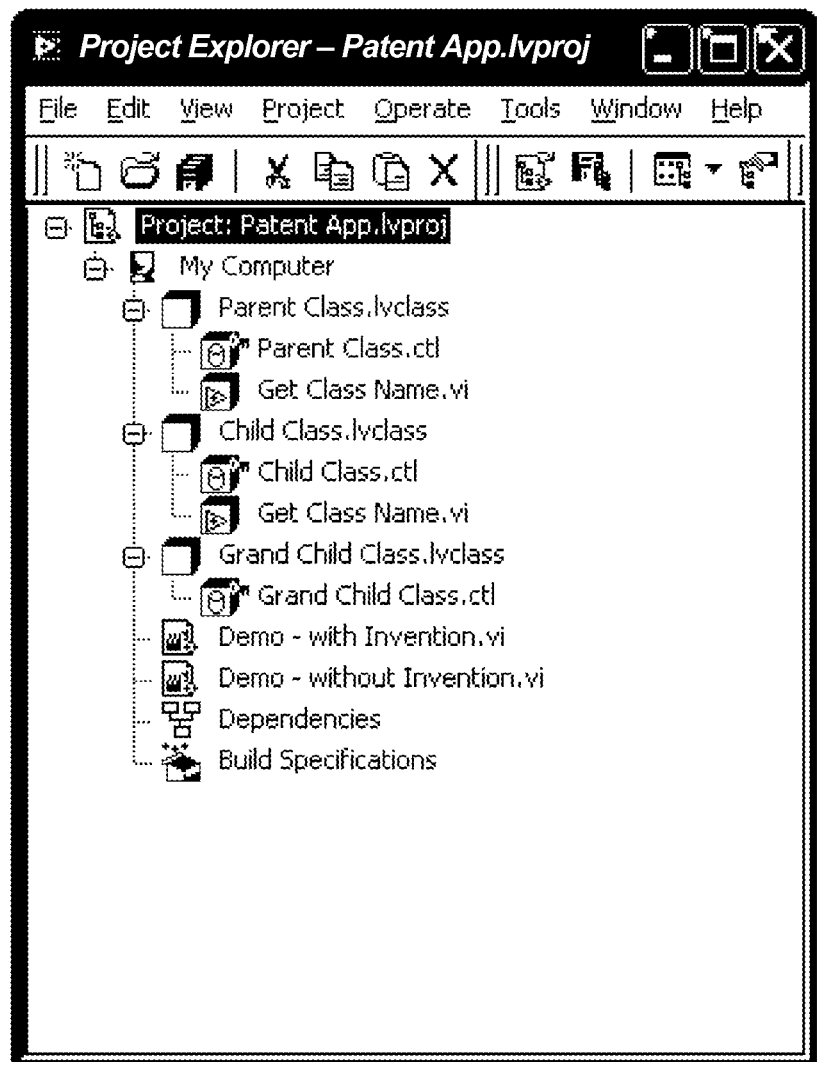
FIGS. 20A-20E illustrate an exemplary implementation of type propagation for automatic casting of output types in a graphical program, according to one embodiment.
Figure 20B:
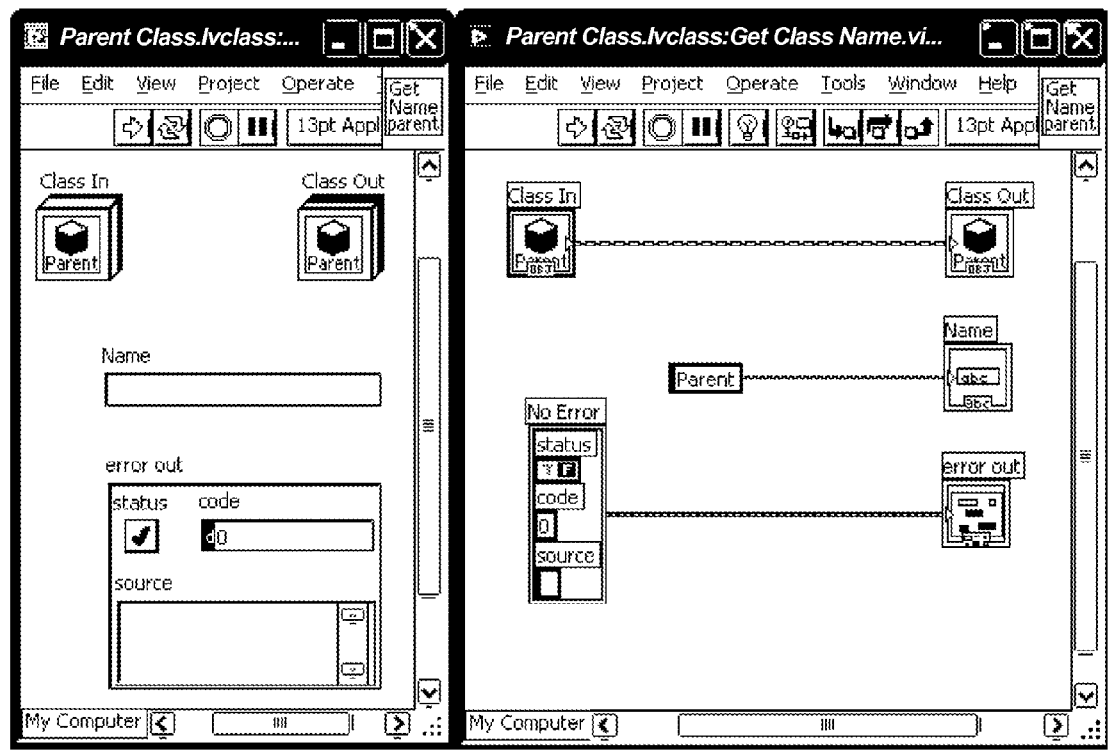
Figure 20C:
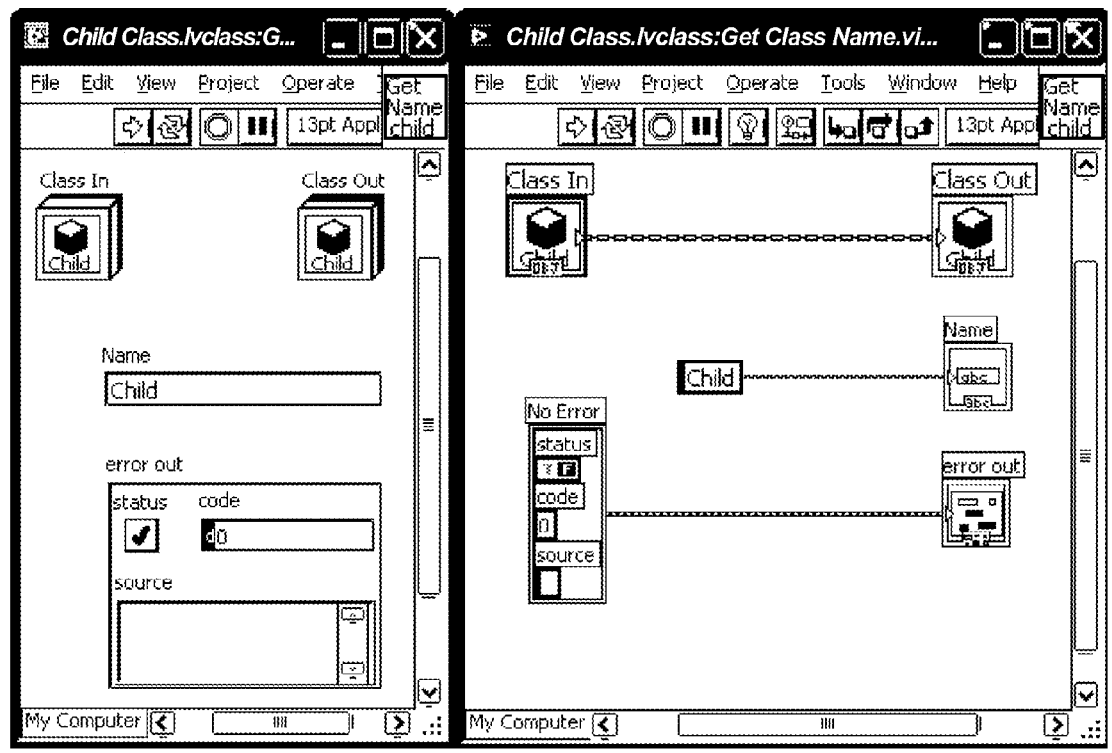
Figure 20D:
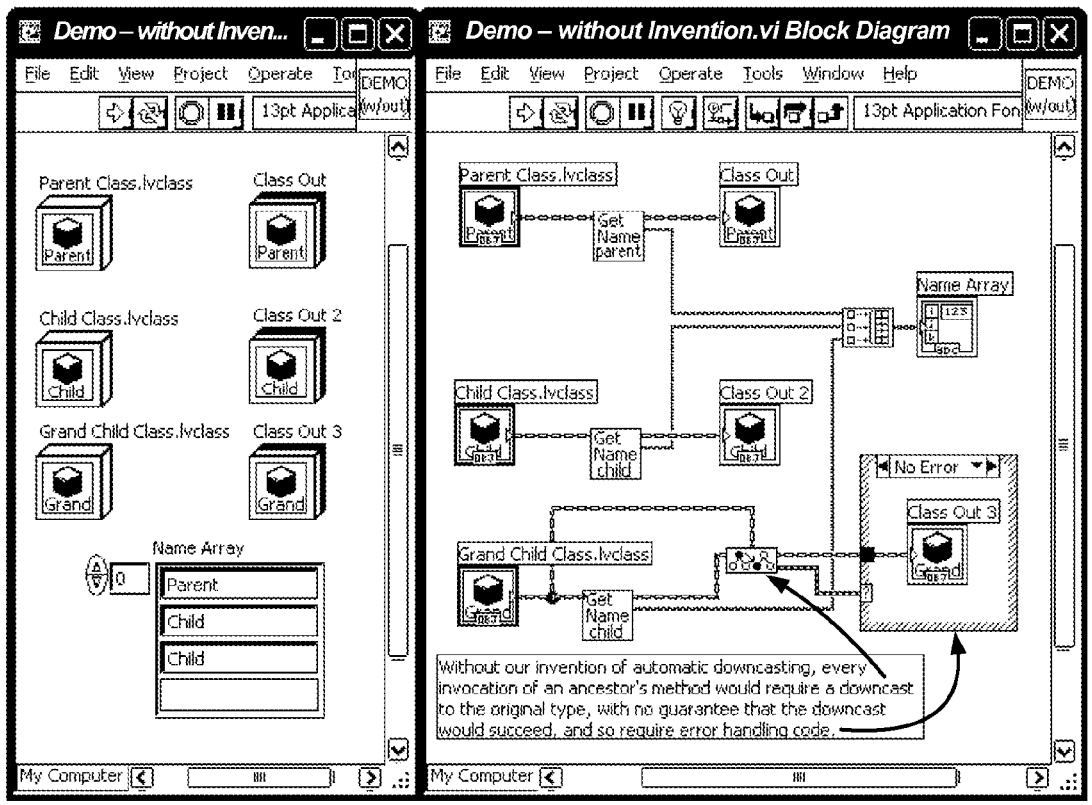
Figure 20E:
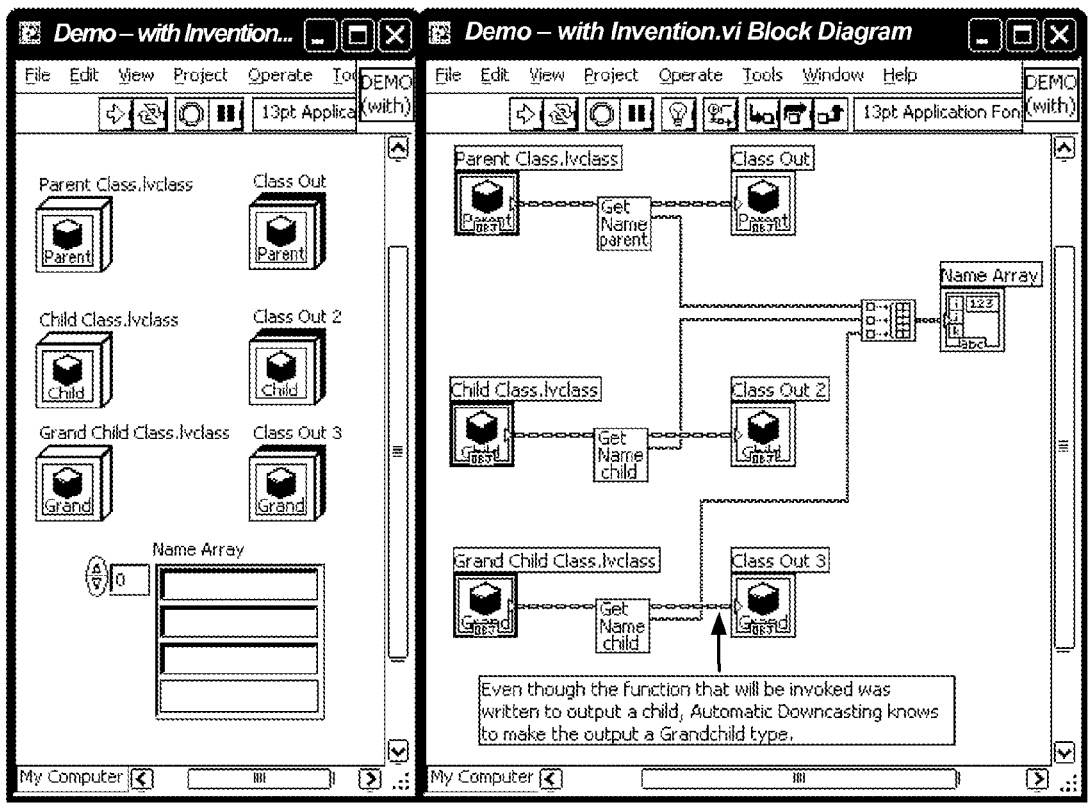

FIGS. 19A and 19B—Example Graphical Programs and Calling Relationships

FIGS. 19A and 19B illustrate exemplary graphical programs and calling relationships. More specifically, FIG. 19A illustrates a graphical program, named "Alpha" in the LabVIEW language, as provided by National Instruments, and FIG. 19B illustrates another LabVIEW graphical program, named "Beta", that calls or invokes Alpha. In this system, each graphical program may be referred to as a Virtual Instrument, or VI. A VI generally includes two parts: a front panel that defines the user interface for the program, here labeled "Beta.vi Front Panel", and a block diagram that defines the functionality of the program, here labeled "Beta.vi Block Diagram".

The front panel may contain user interface elements common to many programs in use today—text fields for character or number entry from the keyboard, buttons, etc. As may be seen, in the example of FIG. 19A, there are two numeric controls (on the left) labeled X and Y and a single numeric indicator labeled "Answer". Controls are used for receiving input, while indicators are used for displaying data, e.g., output from the program.

As described above, a block diagram generally includes three basic elements: front panel terminals, nodes and wires (more complex elements are special cases or composites of these basic ideas). In the embodiment shown, the front panel terminals, or FPTerminals, are the colored boxes with labels (specifically, "First Position", "$2^{nd}$ Position", and "Distance") that correspond to the user interface elements of the front panel. The nodes represent or implement operations in the program. In this example the block diagram contains two Multiply nodes and an add node. The wires show the flow of data through the diagram. Data originate at the FPTerminal(s) and "flow" from them to the nodes. When a node has all of its inputs, it may execute its assigned operation on the input data and output that data to the next node downstream. This process iterates until all nodes have executed and the output data arrive at the indicator FPTerminal(s). In the example of FIG. 19A, data flow from the X and Y FPTerminals to the two Multiply nodes. Each Multiply node takes its two inputs and multiplies them together. In the above example, the input is squared by multiplying it by itself. Note that there is generally no certain order in which the two Multiply nodes will execute. When there are no wires tying two nodes together, they may be free to execute independent of each other. Each of the Multiply nodes sends its output down to the Add node. The Add node computes the sum of the two inputs and sends it at last to the Answer FPTerminal. The result is displayed on the front panel.

Note that in general, every VI is a stand-alone graphical program which may be executed. Each may also be used as a subroutine of another more complex VI.

Turning now to FIG. 19B, as may be seen, the graphical program Beta's front panel contains two controls and an indicator. The controls in this case, labeled First Position and 2nd Position, are aggregate controls that combine two numeric controls to create a single value representing a point in a coordinate system. On Beta's block diagram, there are two FPTerminals that represent these inputs. The inputs flow through the various nodes on the diagram until the result reaches the Distance FPTerminal, as shown.

Of particular note is the node in the Beta block diagram labeled Alpha.vi. This node is referred to as "a subVI call" and represents an invocation of another VI to be used as a subroutine of this VI. In this example, during execution Beta.vi makes a call to (i.e., invokes) Alpha.vi, passing in two inputs (from an "unbundled" node). Alpha.vi executes and returns an output back to Beta.vi.

Note that when referring to any VI, the terms "graphical program" or "function" may be used, since every VI may be executed by itself or may be used as a subroutine of another VI. When a first VI uses a second VI in this way, the first VI is referred to as the "calling VI" and second VI is referred to as the "subVI". The node in a diagram that represents this invocation of another VI is called a "subVI node" (e.g., the Alpha.vi node in the Beta block diagram). Note that the subVI node is distinct from the subVI itself.

FIGS. 20A-20E—Example Implementation

FIGS. 20A-20E illustrate an exemplary implementation of type propagation for automatic casting of output types in a graphical program, according to one embodiment. Note that while the examples described are in the LabVIEW Graphical Programming Environment provided by National Instruments Corporation, any other graphical programming system may be used as desired.

FIG. 19A illustrates a project tree that displays to the user the various components of a system being created. In this instance, the user has created three classes: Parent, Child and Grandchild, with the implied inheritance relationships, as is well known to those of skill in the art of object-oriented programming. As may be seen, the Parent and the Child class both have implemented versions of a method "Get Class Name.vi". The Grandchild class has not implemented any such method, and so will inherit its parent's version (Child is the parent of Grandchild). The two VIs at the bottom of the project tree are VIs that use these classes. These VIs are described below, and respectively illustrate graphical program code with and without automatic downcasting.

FIGS. 19B-19C illustrate the two different versions of the method Get Class Name, specifically, FIG. 19B illustrates the Parent version of the method, and FIG. 19C illustrates the Child version. Note that these are very simple functions—all they do is output a name for the class, leaving the class itself unmodified. However, they are sufficient to show the automatic downcasting behavior described below with reference to FIGS. 19D and 19E.

FIG. 19D illustrates graphical program code for a graphical program "Demo—without Invention.vi", which shows how complex a method invocation can be in a dataflow language without automatic downcasting, i.e., without using the techniques disclosed herein. The block diagram of FIG. 19D shows three invocations of the same method, Get Class Name.vi, specifically, subVI nodes with white rectangular icons (just left of the middle of the block diagram) and respective titles "Get Name parent", "Get Name child", and "Get Name child". As may be seen, the first invocation is wired with Parent type, i.e., is configured to receive input of type Parent. Because Parent has its own definition of Get Class Name.vi, that version of the method (subVI) will be called. The second invocation is wired with Child type, which also has its own invocation, and so the icon shown is for Child's version of the method. Note that both of these first two invocations call functions (subVIs) that were written to take the input type they are wired with and output that same type, so there is no need for downcasting the output.

The third invocation, however, shows where the problem arises. This call to Get Class Name.vi is wired with a Grandchild type. Grandchild does not provide its own implementation of Get Class Name.vi, and so it inherits Child's version. However, Child's version of Get Class Name.vi was written to take a Child type input and produce a Child type output. Although a user studying the entire system can determine that the Child will always be safe to downcast to be a Grandchild, the compiler (without use of the present invention) does not know this. Thus, the programmer must go through the cumbersome task of explicitly downcasting the output, and possibly having to deal with an error in that downcast (e.g., because the programmer may not know the implementation details of Get Class Name.vi, and thus may not know that this downcast will always work). Adding this much overhead to a method invocation each time a class does not explicitly override its parent's method may make the object model of dataflow so cumbersome as to be unusable.

FIG. 19E illustrates graphical program code for a graphical program "Demo—with Invention.vi", which is identical to the graphical program of 19D except for the third invocation (Grandchild). Note that in the third invocation the compiler is able to analyze the diagrams of Get Class Name.vi and determine that when a Grandchild type is connected to the input, the output will always be safe to downcast to a Grandchild type. And so the compiler automatically makes this downcast at the invocation, saving the programmer from having to do it. This dramatically improves the readability of the code, and improves the stability of the code as well. Had the compiler's analysis revealed that the downcast was not guaranteed to succeed, the output would have remained a Child output, i.e., would have remained an output of type Child, thus indicating to the programmer that he or she may have unexpected types on the wire, in response to which they may change their design or simply handle the downcast error in that particular case.

Thus, various embodiments of the techniques described above may facilitate type propagation for automatic casting of output types in a data flow program, where the data flow program may be a graphical program, or text-based program.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A memory medium comprising program instructions, wherein the program instructions are executable to perform:
   as a user edits source code of an object-oriented data flow program:
   identifying a first data flow function in the object-oriented data flow program that comprises at least one input of a parent data type and at least one output of the parent data type;
   analyzing the first data flow function to determine if the at least one output will always be of the same data type as the at least one input;
   identifying a second data flow function in the object-oriented data flow program that comprises a program element that calls the first data flow function, passing an input parameter of a child data type of the parent data type as input; and
   if said analyzing determines that an output parameter returned by the at least one output of the first function will always be of the child data type, automatically modifying the source code of the program element to change the output parameter from the parent data type to the child data type.

2. The memory medium of claim 1, wherein the at least one output of the first data flow function has one or more ultimate sources, wherein each ultimate source comprises an input or output whose type at run-time is independent of upstream data in the first data flow function, and wherein said analyzing the first data flow function comprises:
determining if the one or more ultimate sources for the at least one output of the first data flow function are all of the child data type.

3. The memory medium of claim 1, wherein the first data flow function includes calls to one or more of:
at least one user-defined function; or
at least one language primitive.

4. The memory medium of claim 1, wherein said identifying the first data flow function, said analyzing the first data flow function, said identifying the second data flow function, and said automatically modifying are performed by a compiler.

5. The memory medium of claim 1, wherein said identifying the first data flow function, said analyzing the first data flow function, said identifying the second data flow function, and said automatically modifying are performed at edit time.

6. The memory medium of claim 1, wherein said identifying the first data flow function, said analyzing the first data flow function, said identifying the second data flow function, and said automatically modifying are performed without direct guidance by human intelligence.

7. The memory medium of claim 1,
wherein the object-oriented data flow program is a graphical program comprising a first plurality of interconnected nodes that visually indicate functionality of the graphical program, and wherein the source code comprises the first plurality of interconnected nodes;
wherein the first data flow function comprises a first graphical subprogram;
wherein the second data flow function comprises a second graphical subprogram comprising a second plurality of interconnected nodes, wherein source code of the second graphical subprogram comprises the second plurality of interconnected nodes, and wherein the second graphical subprogram is represented by a first node comprised in the first plurality of interconnected nodes; and
wherein the program element is a second node comprised in the second plurality of interconnected nodes, and wherein the second node represents an invocation of the first data flow function.

8. The memory medium of claim 7, wherein the program instructions are further executable to implement:
configuring an input terminal of the second node to receive data of the child data type;
wherein said identifying the second data flow function comprises analyzing the second graphical subprogram, including:
determining the second node of the second plurality of nodes, wherein the second node has an input terminal of the parent data type and an output terminal of the parent data type, wherein the second graphical subprogram provides the input parameter of the child data type for the input terminal, and wherein the second node is executable to provide the output parameter for the output terminal;
wherein said analyzing the first data flow function comprises analyzing the program element to determine if the output parameter of the program element is always of the same type as the input parameter, including:
analyzing the second node to determine if an output terminal of the second node will always provide the output parameter of the child data type; and
wherein said automatically modifying the source code of the program element to change the output parameter from the parent data type to the child data type comprises:
automatically modifying the second node to provide data of the child data type on the output terminal.

9. The memory medium of claim 8,
wherein the first graphical subprogram comprises a third plurality of interconnected nodes;
wherein the output terminal of the second node has one or more ultimate sources, wherein each ultimate source comprises a source terminal whose type at run-time is independent of by upstream data in the first graphical subprogram, and wherein said analyzing the second node to determine if an output terminal of the second node can always provide the output parameter of the child data type comprises:
traversing a diagram of the first graphical subprogram to determine the one or more ultimate sources for the output terminal of the second node;
determining if the one or more ultimate sources for the output terminal of the second node are all of the child data type.

10. The memory medium of claim 9,
wherein each of the third plurality of nodes includes one or more terminals; and
wherein said traversing the diagram of the first graphical subprogram comprises:
generating a map of each terminal in the first graphical subprogram to a respective set of terminals in the first graphical subprogram that are ultimate sources.

11. The memory medium of claim 10, wherein said generating a map comprises:
for each node in the diagram that has no input terminals,
a) for each output terminal of the node,
if the output terminal is its own ultimate source, adding the output terminal to the map, and specifying the output terminal as its ultimate source;
for each sink terminal associated with the output terminal,
adding the sink terminal to the map, and specifying the output terminal's ultimate sources as the sink terminal's ultimate sources; and
performing a) for a node corresponding to the sink terminal.

12. The memory medium of claim 10, wherein the traversal is performed in execution order of the nodes.

13. The memory medium of claim 9, wherein the diagram comprises one or more of:
a block diagram of the first graphical subprogram;
a data structure specifying the diagram; or
a description of the diagram.

14. The memory medium of claim 7, wherein said analyzing the program element comprises analyzing source code for the program element.

15. The memory medium of claim 7, wherein said analyzing the first data flow function comprises analyzing source code for the first data flow function.

16. The memory medium of claim 7, wherein the graphical program comprises a LabVIEW graphical program.

17. The memory medium of claim 1, wherein the object-oriented data flow program comprises a text-based data flow program.

18. A method, comprising:
utilizing a computer to perform:
as a user edits source code of an object-oriented data flow program:
identifying a first data flow function in the object-oriented data flow program that comprises at least one input of a parent data type and at least one output of the parent data type;
analyzing the first data flow function to determine if the at least one output will always be of the same data type as the at least one input;
identifying a second data flow function in the object-oriented data flow program that comprises a program element that calls the first data flow function, passing an input parameter of a child data type of the parent data type as input; and
if said analyzing determines that an output parameter returned by the at least one output of the first function will always be of the child data type,
automatically modifying the source code of the program element to change the output parameter from the parent data type to the child data type.

19. A system, comprising:
a processor; and
a memory medium coupled to the processor, wherein the memory medium stores program instructions which are executable by the processor to:
as a user edits source code of an object-oriented data flow program:
identify a first data flow function in the object-oriented data flow program that comprises at least one input of a parent data type and at least one output of the parent data type;
analyze the first data flow function to determine if the at least one output will always be of the same data type as the at least one input;
identify a second data flow function in the object-oriented data flow program 4 comprises a program element that calls the first data flow function, passing an input parameter of a child data type of the parent data type as input; and
if said analysis determines that an output parameter returned by the at least one output of the first function will always be of the child data type,
automatically modifying the source code of the program element to change the output parameter from the parent data type to the child data type.

* * * * *

UNITED STATES PATENT AND TRADEMARK OFFICE
CERTIFICATE OF CORRECTION

PATENT NO. : 8,438,550 B2  
APPLICATION NO. : 12/779341  
DATED : May 7, 2013  
INVENTOR(S) : Mercer et al.

It is certified that error appears in the above-identified patent and that said Letters Patent is hereby corrected as shown below:

Title page:

Item (74) *Attorney, Agent, or Firm*:
please delete "Jerry" and substitute -- Jeffrey --.

Signed and Sealed this
Eighteenth Day of June, 2013

Teresa Stanek Rea
*Acting Director of the United States Patent and Trademark Office*